United States Patent
Kabasawa

(10) Patent No.: US 6,874,153 B2
(45) Date of Patent: Mar. 29, 2005

(54) RECORDING MEDIUM LOADING APPARATUS

(75) Inventor: Hidetoshi Kabasawa, Saitama-ken (JP)

(73) Assignee: Teac Corporation, Tokyo (JP)

( * ) Notice: Subject to any disclaimer, the term of this patent is extended or adjusted under 35 U.S.C. 154(b) by 96 days.

(21) Appl. No.: 09/974,593

(22) Filed: Oct. 9, 2001

(65) Prior Publication Data

US 2002/0044518 A1 Apr. 18, 2002

(30) Foreign Application Priority Data

Oct. 13, 2000 (JP) ........................................ 2000-314231
Oct. 13, 2000 (JP) ........................................ 2000-314232

(51) Int. Cl.[7] .............................................. G11B 17/04
(52) U.S. Cl. ..................................................... 720/623
(58) Field of Search ................................ 720/617, 619, 720/620, 622, 623; 369/75.2, 77.1; 360/99.02, 99.03, 99.06, 99.07

(56) References Cited

U.S. PATENT DOCUMENTS

| | | | | |
|---|---|---|---|---|
| 5,737,293 A | * | 4/1998 | Kawamura et al. | 369/77.1 |
| 6,134,206 A | * | 10/2000 | Furukawa et al. | 369/77.2 |
| 6,167,015 A | * | 12/2000 | Jeong | 369/77.1 |
| 6,191,914 B1 | * | 2/2001 | Challener et al. | 360/99.08 |
| 6,192,019 B1 | * | 2/2001 | Kurokawa et al. | 369/77.1 |
| 6,215,752 B1 | * | 4/2001 | Kabasawa | 369/77.2 |
| 6,272,093 B1 | * | 8/2001 | Kurozuka et al. | 369/77.2 |
| 6,314,073 B2 | * | 11/2001 | Horie | 369/77.2 |
| 6,388,974 B1 | * | 5/2002 | Kato | 369/77.1 |
| 6,504,808 B2 | * | 1/2003 | Wada et al. | 369/75.2 |
| 6,538,971 B2 | * | 3/2003 | Seo et al. | 369/77.2 |

FOREIGN PATENT DOCUMENTS

EP          0836184 A2     4/1998

\* cited by examiner

*Primary Examiner*—Brian E. Miller
(74) *Attorney, Agent, or Firm*—J.C. Patents

(57) ABSTRACT

A recording medium loading apparatus having a carrier unit 70 for transferring inserted discs 11, 12 from an eject position and a loaded position, and a holding device installed on the carrier 70 for the outer circumferences of the discs 11, 12. The holding device is formed by clip discs 74 consisting of a fixing portion 85 fixed on the carrier unit 70, and tongue pieces 86 that protrudes from the fixing portion 85 and are in contact with the front edge in the insertion direction of the discs 11, 12 by an actuating force. Therefore, the recording medium loading apparatus can load various types of recording media. When the disc-shaped recording medium is loaded, damages to the discs can be prevented and highly accurate loading process is possible.

7 Claims, 23 Drawing Sheets

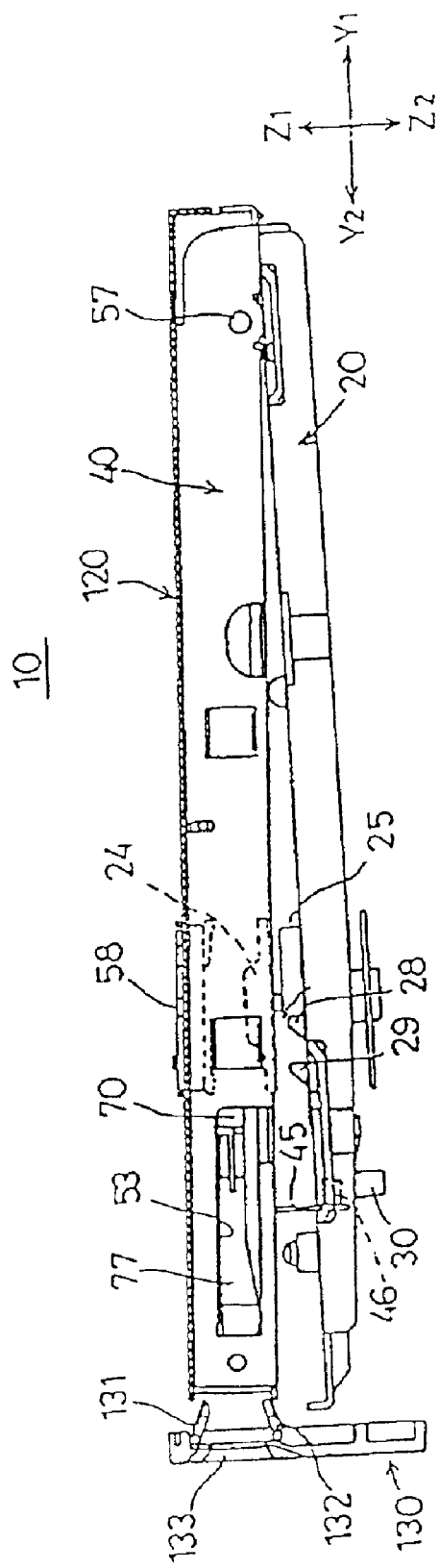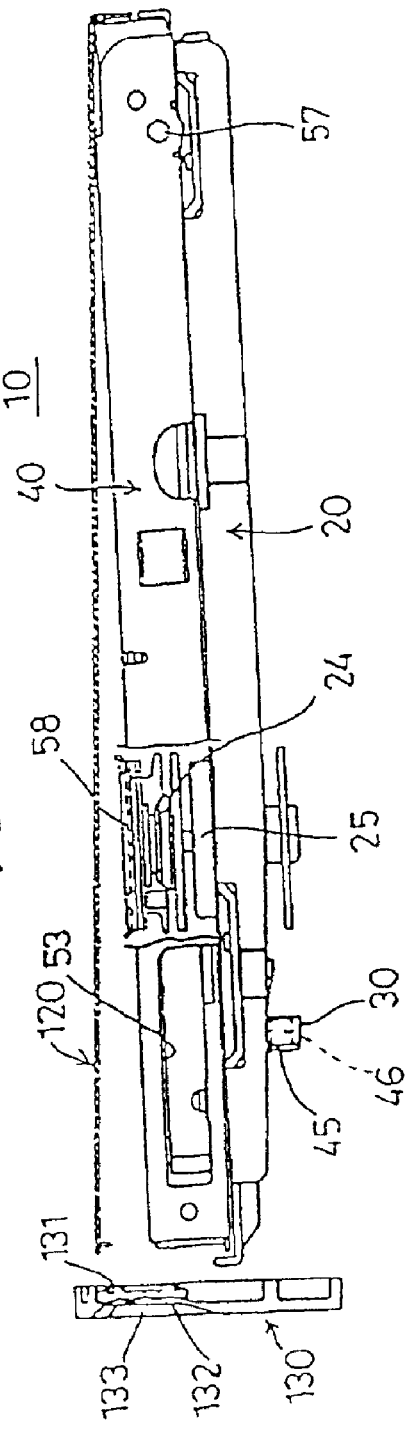
FIG. 4A
FIG. 4B

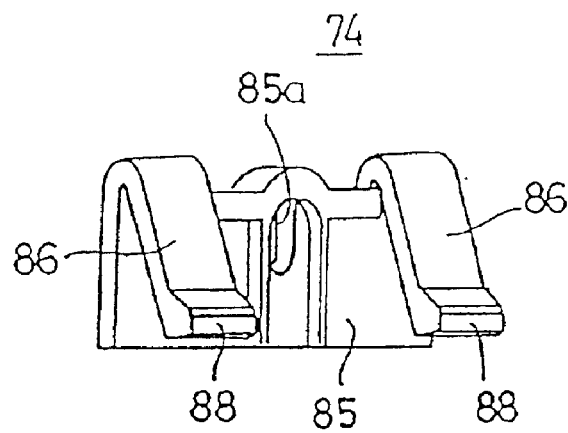
FIG. 6A
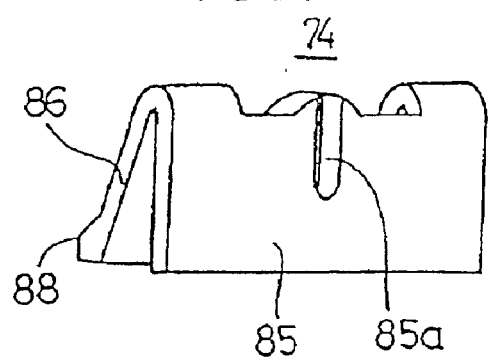
FIG. 6B
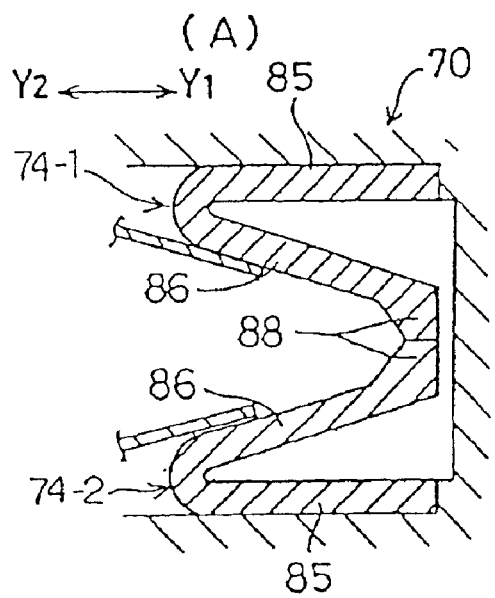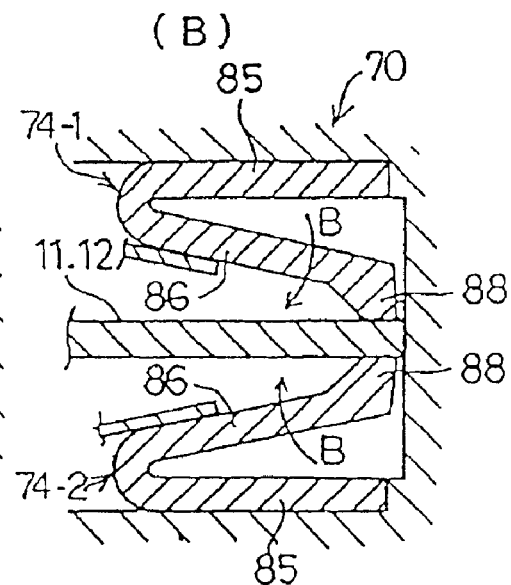
FIG. 7A  FIG. 7B

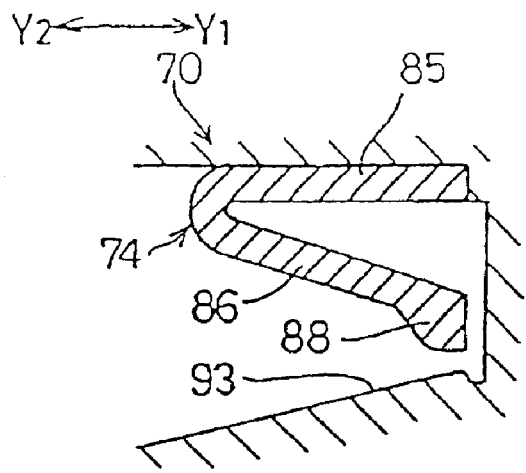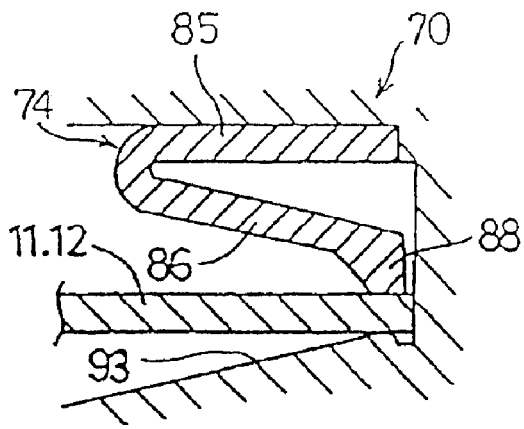
FIG. 8A  FIG. 8B
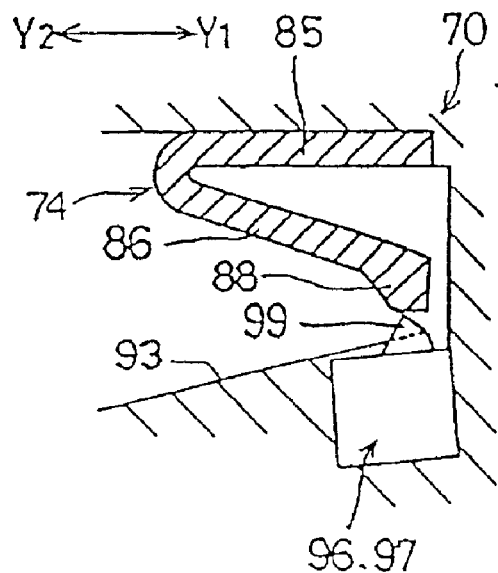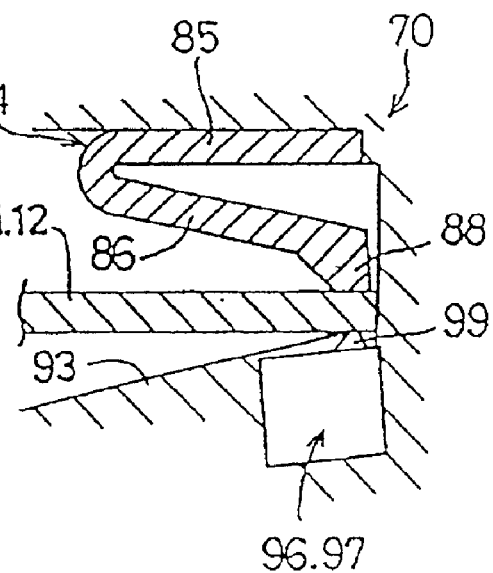
FIG. 9A  FIG. 9B

RECORDING MEDIUM LOADING APPARATUS

CROSS-REFERENCE TO RELATED APPLICATION

This application claims the priority benefit of Japanese application serial no. 2000-314231, filed on Oct. 13, 2000, and 2000-314232, filed on Oct. 13, 2000.

BACKGROUND OF THE INVENTION

1. Field of the Invention

The present invention relates in general to a loading apparatus for a recording medium. More specifically, the present invention relates to a loading apparatus capable of transferring an inserted disc-shaped recording medium.

2. Description of Related Art

A conventional recording medium loading apparatus installed in a disc apparatus having exchangeable property for a plurality types of disc recording media (referring to a compatible disc apparatus, hereinafter) is used as an example for description. For example, a disc apparatus used as a device for reproducing or recording information is built in or externally connected to an electronic apparatus, such as a personal computer or a word processor. The disc apparatus uses the disc-shaped recording medium as its recording medium. In addition, the disc-shaped recording medium is loaded into the disc apparatus using a recording medium loading apparatus and is then reproduced or recorded.

On the other hand, a variety of disc recording media are also provided, for example CD (Compact Disc), CD-R (Compact Disc-Recordable), CD-ROM (Compact Disc-Read Only Memory), CD-RW (Compact Disc-Rewritable), DVD-ROM (Digital Versatile Disc-Read Only Memory), DVD-RAM (Digital Versatile Disc-Random Access Memory) are well known. In addition, there are two kinds of recording medium: one is the disc with a diameter of 12 cm, and the other is the disc with a diameter of 8 cm. Moreover, for the DVD-RAM, three kinds can be classified, including wherein the disc is enfolded in a cartridge.

As described above, although a variety of disc-shaped recording media is provided, it would be convenient if the reproducing and/or recording process for each disc-shaped recording medium could be performed by one disc apparatus. Therefore, a compatible disc apparatus having the exchangeable property for each disc-shaped recording medium is provided.

A variety of the disc-shaped recording media have to be transferred in the main body of the disc apparatus for the compatible disc apparatus. Conventionally, for the recording medium loading apparatus, a tray is used as the transferring device in the main body of the disc apparatus.

The tray can be drawn out of the main body of the disc apparatus when the disc-shaped recording medium is loaded or ejected (referring to eject time, hereinafter). In addition, loading recesses are formed on a disc loading surface of the tray for loading the 12 cm disc, 8 cm disc and the disc cartridge, thereby a variety of the disc-shaped recording media can be loaded on the tray.

For the conventional compatible disc apparatus, because the tray is installed for loading the disc-shaped recording media, it is necessary for the tray to be greatly drawn out of the main body of the disc apparatus when the disc-shaped recording media are loaded to or removed from the tray. Therefore, for the conventional compatible disc apparatus, when the disc apparatus is installed, it is necessary to estimate the drawing distance of the tray in advance for setting required space, which becomes a problem in that the installation space becomes large.

Furthermore, an external force is easily applied to the tray when the tray is greatly drawn out of the main body of the disc apparatus. Therefore, for the structure using the tray to transfer the disc-shaped recording media, there is a problem that malfunction is easily caused due to the applied external force.

Additionally, a device without installing the tray for solving the foregoing problems is provided, in which a pair of loading rollers is installed on the disc insertion opening of the main body of the disc apparatus. The disc-shaped recording medium is gripped between the loading rollers and then the loading rollers are rotated, thereby the loading process is executed. For example, this loading method is used in the loading process of an audio-CD for a car stereo system.

However, it is obvious for this loading method that the front of the disc-shaped recording medium is in contact with the rollers when the disc is loaded, causing a problem wherein the disc-shaped recording medium is damaged. In particular, for the disc-shaped recording medium having large recording capacity such as the DVD, the recorded data may be greatly lost even if the DVD has only a small scratch thereon.

Moreover, the rollers are usually made of elastic materials, such as gum, and therefore, the rollers becomes degraded after long-time use. As the rollers are degraded, relative slide between the rollers and the disc-shaped recording medium occurs, thereby the proper loading process cannot be processed.

In addition, a device for loading various types of the disc-shaped recording medium using a clamp lever rather than the tray is provided, by which the disc-shaped recording medium is brought into the main body of the disc apparatus by the clamp lever. However, for the structure using the clamp lever, the clamp lever is different from the tray in one aspect that the clamp lever cannot hold the whole disc-shaped recording medium and the clamp lever can usually hold only the front or side edge of the disc-shaped recording medium. Therefore, the hold of the disc by the clamp lever is weaker than that by the tray. The disc-shaped recording medium may be detached from the clamp lever if a large external force is applied to the disc in such a holding status.

SUMMARY OF THE INVENTION

To solve the foregoing problems, it is an object of the invention to provide a recording medium loading apparatus for preventing the disc-shaped recording medium from being damaged during the loading process and capable of performing a highly accurate loading process.

It is another object of the invention to provide a recording medium loading apparatus to save the installation space and stably hold and transfer the disc-shaped recording medium.

According to the object(s) mentioned above, the present invention provides a recording medium loading apparatus capable of loading a disc-shaped recording medium, which comprises the following elements. A carrier is used for transferring the disc-shaped recording medium between a first position to insert/remove the disc-shaped recording medium and a second position to perform a reproducing and/or recording process. A holding device is installed on the carrier for holding an outer circumference of the disc-shaped recording medium. The holding device comprises a fixing portion fixed to the carrier and tongue pieces with elastic property extending from the fixing portion and being in contact with a front edge of the disc-shaped recording medium with respect to an insertion direction by an actuating force.

The tongues pieces mentioned above gradually close to the disc-shaped recording medium with respect to the insertion direction and then contact with the outer circumference of the disc-shaped recording medium.

In addition, a disc detecting switch is installed opposite to the tongue pieces for detecting the loading of the disc-shaped recording medium by means of being in contact with the outer circumference of the disc-shaped recording medium.

The invention further provides a recording medium loading apparatus, comprising the following elements. A transferring mechanism is used for transferring a disc-shaped recording medium between an eject position and a loaded position. A holder is used for holding the transferring mechanism. A base has a turntable, and the turntable is capable of rotatably driving the disc-shaped recording medium in a status wherein the disc-shaped recording medium is loaded. A driving mechanism is used for loading the disc-shaped recording medium on the turntable by driving the holder and the base to be in relatively close proximity. A disc holding member is installed on the transferring mechanism and the holder is used for engaging with the disc-shaped recording medium and then holding the disc-shaped recording medium to be transferred. A holding member driving device is installed on the base, for engaging with the disc holding member when the disc-shaped recording medium is transferred accompanied with the holder and the base being in relatively close proximity, and for detaching the disc-shaped recording medium from the disc holding member when the disc-shaped recording medium is loaded onto the turntable.

According to foregoing embodiments, the disc-shaped recording medium is transferred between the first position and the second position by the carrier. At this time, in which the disc-shaped recording medium is transferred, the outer circumference of the disc is held by the holding device installed on the carrier. Therefore, the surface of the disc-shaped recording medium can be prevented from damage.

In addition, because the holding device further comprises a fixing portion fixed to the carrier and tongue pieces with elastic property extending from the fixing portion and being in contact with a front edge of the disc-shaped recording medium with respect to an insertion direction by an actuating force, the disc-shaped recording medium can be firmly and accurately held by a simple structure.

Furthermore, because the transferring process is processed in a clamped status wherein the holding device is in contact with the front edge of the disc-shaped recording medium, the relative slide between the holding device and the disc-shaped recording medium does not occur during the transferring process, thereby a highly accurate transferring process can be performed.

Additionally, because the tongues pieces gradually close to the disc-shaped recording medium with respect to the insertion direction and then contact with the outer circumference of the disc-shaped recording medium, even though a drawing force from the carrier is applied to the disc-shaped recording medium in the holding status, the drawing force is resiliently applied to the disc-shaped recording medium. Thereby, when the disc-shaped recording medium is transferred, even if the drawing force is applied to the disc by mistake, the disc-shaped recording medium can be prevented from being detached from the holding device.

In addition, the disc-shaped recording medium is gripped between the holding device and the disc detecting switch when the disc-shaped recording medium is loaded into the carrier. Because the disc detecting switch is contact with the outer circumference of the disc-shaped recording medium, the disc-shaped recording medium is held by the disc detecting switch because the disc is gripped between the holding device and the disc detecting switch.

Therefore, comparing with that the disc-shaped recording medium is gripped and held by two holding devices, the part number can be reduced and the carrier can become more compact and small.

Alternatively, the disc-shaped recording medium is transferred between the eject position and the loaded position by the transferring mechanism installed on the holder. During the transferring process, the disc holding member installed on the holder is engaged with the transferred disc-shaped recording medium by the transferring mechanism. Therefore, because the disc-shaped recording medium is held by the transferring mechanism and the disc holding member at different positions and then transferred in such status, the disc-shaped recording medium is not detached from the transferring mechanism, thereby a stable transferring process can be performed.

When the reproducing and/or recording process is processed to the disc shaped recording medium, the disc-shaped recording medium is loaded onto the turntable and then rotated. In addition, when the reproducing and/or recording process is processed to the disc shaped recording medium, the disc holding member is detached from the disc shaped-recording medium by the holding member driving device without impeding the rotation of the disc shaped recording medium. The holding member driving device is installed on the base for engaging with the accompanied disc holding member, with the holder and the base being in relatively close proximity, and the engaging force is used as a driving force to cause the disc holding member to be detached from the disc shaped recording medium. Therefore, the disc holding member can be accurately detached from the disc shaped recording medium by the simple structure without using any additional driving device such as a solenoid.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIGS. 4A and 4B are side views of the disc apparatus installing a recording medium loading apparatus according to one embodiment of the invention, for explaining the operation of the holder;

FIGS. 6A and 6B are perspective views of the clip disc installed on the carrier unit;

FIGS. 7A and 7B are diagrams for explaining the operation of the clip disc (I);

FIGS. 8A and 8B are diagrams for explaining the operation of the clip disc (II);

FIGS. 9A and 9B are diagrams for explaining the operation of the clip disc (III);

DESCRIPTION OF THE PREFERRED EMBODIMENT

Figure 1:
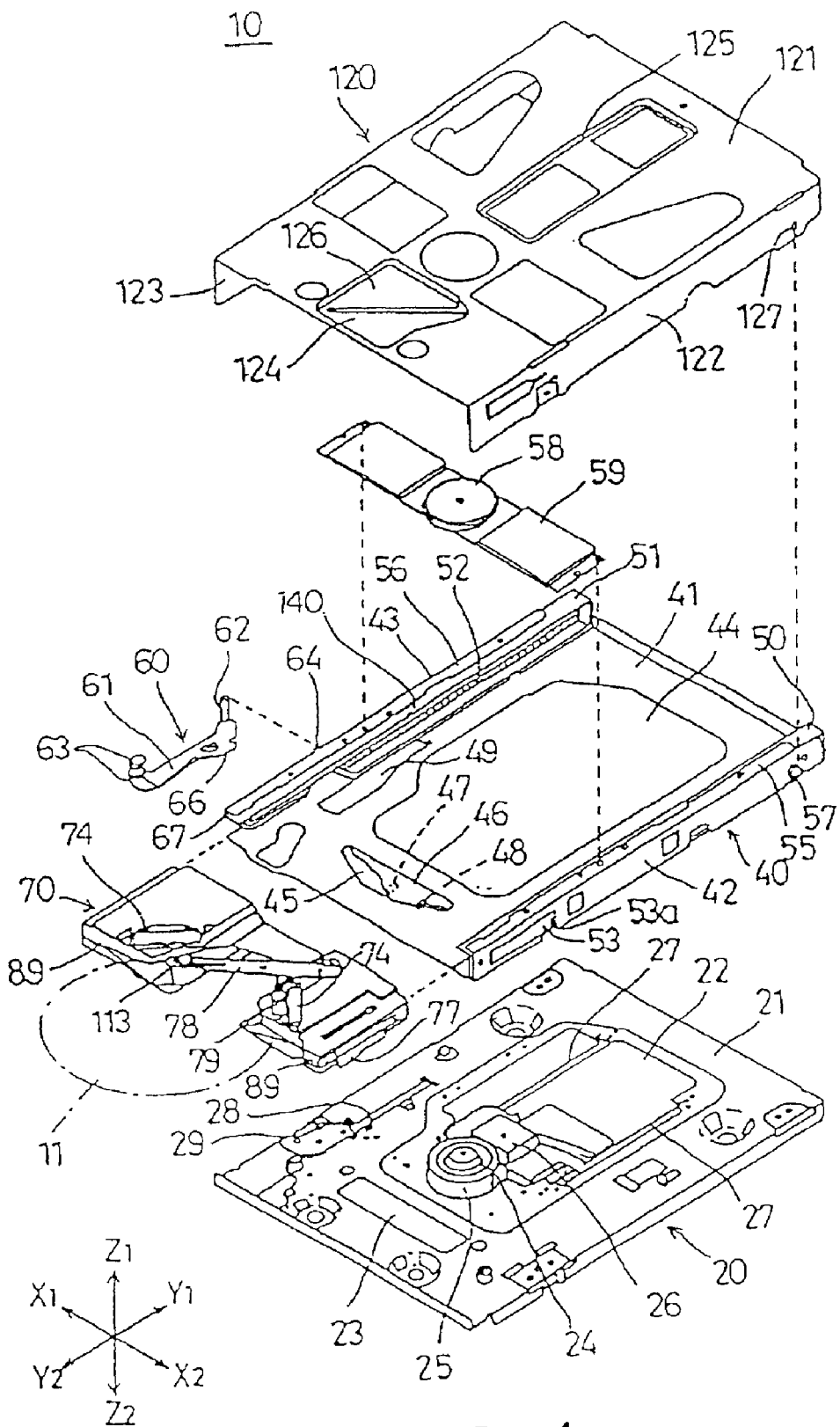
FIG. 1 is an explosive diagram of the disc apparatus installing a recording medium loading apparatus according to one embodiment of the invention.
Figure 2:
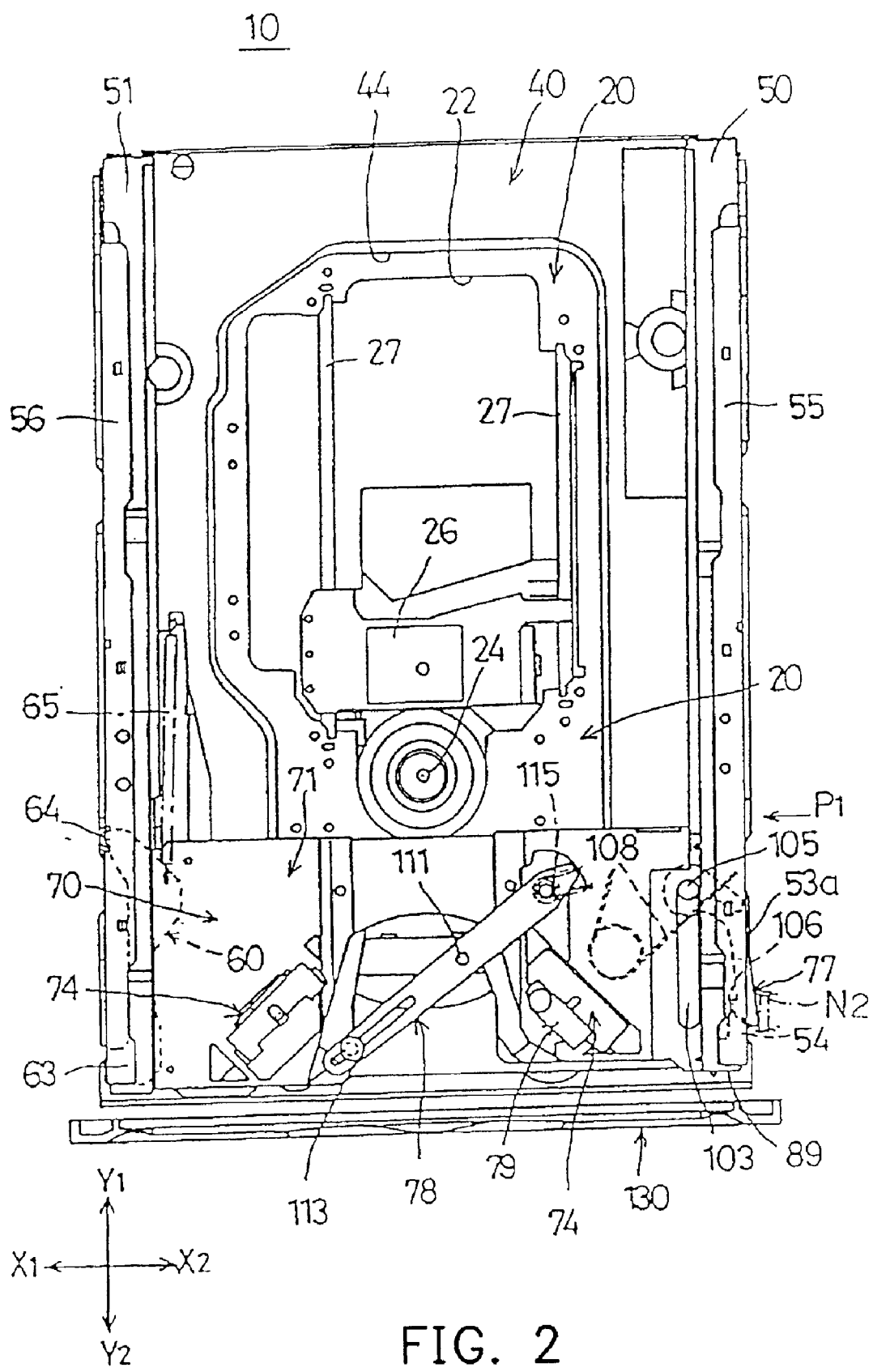
FIG. 2 is a planar view of the disc apparatus installing a recording medium loading apparatus according to one embodiment of the invention.
Figure 3:
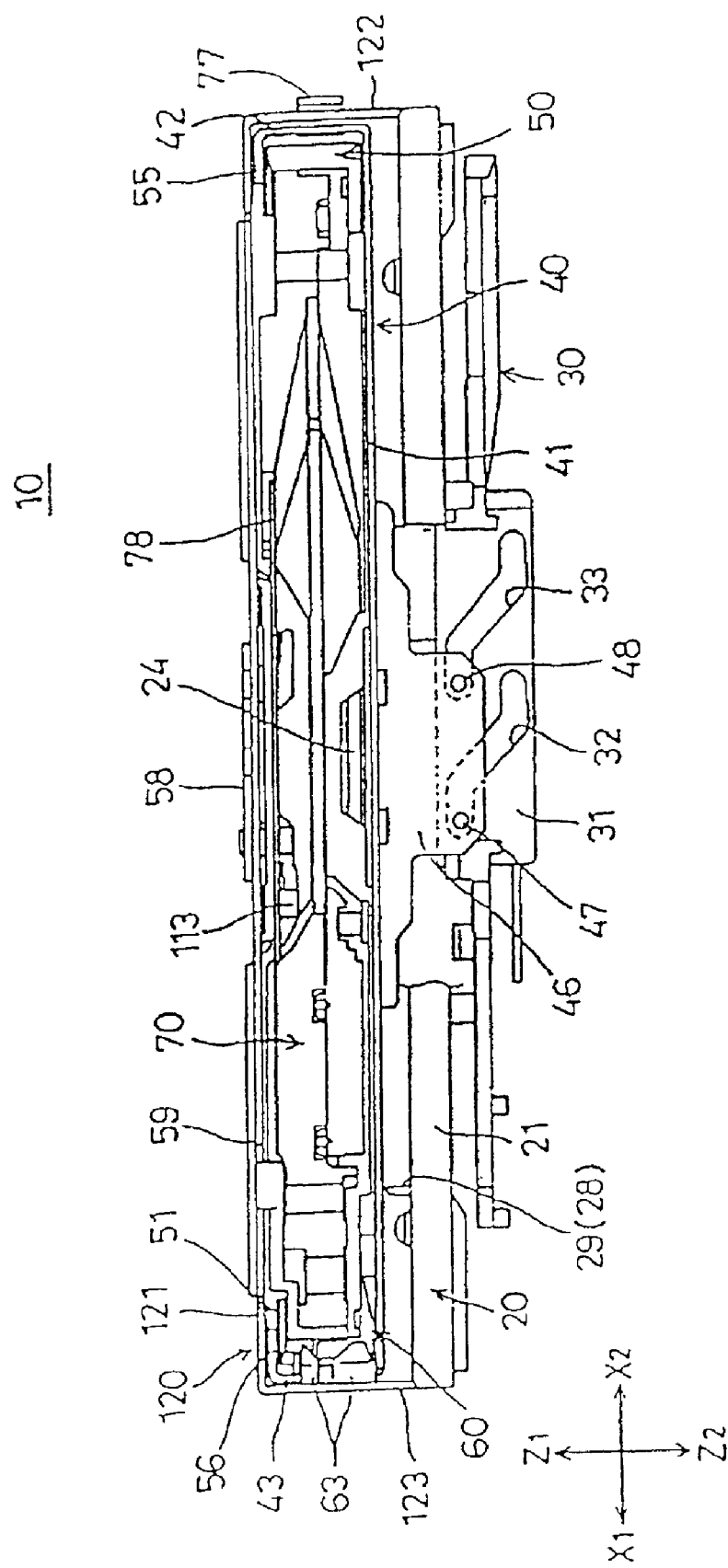
FIG. 3 is a front view of the disc apparatus installing a recording medium loading apparatus according to one embodiment of the invention.

One preferred embodiment of the invention is described in detail accompanying with the drawings. FIGS. 1 to 4A and 4B show a disc apparatus 10 installing a recording medium loading apparatus according to one preferred embodiment of the invention. FIG. 1 shows an explosive diagram of the disc apparatus 10, FIG. 2 shows a planar view of the disc apparatus 10, FIG. 3 shows a front view of the disc apparatus 10 and FIGS. 4A and 4B show side views of the disc apparatus 10.

The disc apparatus 10 in the embodiment is used for loading, reproducing and/or recording a CD, CD-ROM, CD-R, CD-RW, DVD-ROM, DVD-RAM having a diameter of 8 cm (referring to 8 cm disc 11, hereinafter), a CD, CD-ROM, CD-R, CD-RW, DVD-ROM, DVD-RAM having a diameter of 12 cm (referring to 12 cm disc 12, hereinafter), and a disc cartridge 13 enfolding a DVD-RAM 14 therein, which is a compatible disc apparatus.

In addition, for the 8 cm disc 11 and the 12 cm disc 12, the disc is directly loaded into the disc apparatus 10 without being enfolded within a disc cartridge. In contrast, the DVD-RAM 14 is enfolded within a disc cartridge.

The disc apparatus 10 substantially comprises a base 20, a holder 40, a carrier unit and a base cover 120. A turntable 24, a pick-up 26, a first disc lever driving cam 28 and a second disc lever driving cam 29 etc., are assembled in a base body of the base 20. The base body 21 is substantially a plate-shape substrate and has a first opening 22 and a second opening 23 formed thereon. Two guide shafts 27 extending along the Y1 and Y2 directions are accommodated on the base body 21 and separated by a predetermined distance.

A pick-up 26 is guided by each guide shaft 27 and is movably supported, along the arrow directions of Y1 and Y2 as shown, by a pick-up driving mechanism (not shown). The pick-up 26 illuminates laser beams to the disc 11, 12 or 14 that is transferred to a position for performing the reproducing and/or recording process (referring to the loaded position, hereinafter), and then receives the reflected beams from the disc. Thereby, the pick-up 26 can perform the reproducing and/or recording process of the disc 11, 12 or 14.

The turntable 24 is rotated by a disc motor 25 installed on the base body 21 for a predetermined number of revolutions. As described below, when the disc 11, 12 or 14 is moved to the loaded position, the turntable 24 is engaged with center holes 11a, 12a, 14a of the disc 11, 12 or 14 due to the movement of the holder 40 (which will be described in detail below), and then the disc 11, 12 or 14 is clamped by the turntable 24 together with the clamp 58. Therefore, the disc 11, 12 or 14 is rotated by the disc motor 25 for the predetermined number of revolutions.

Figure 22:
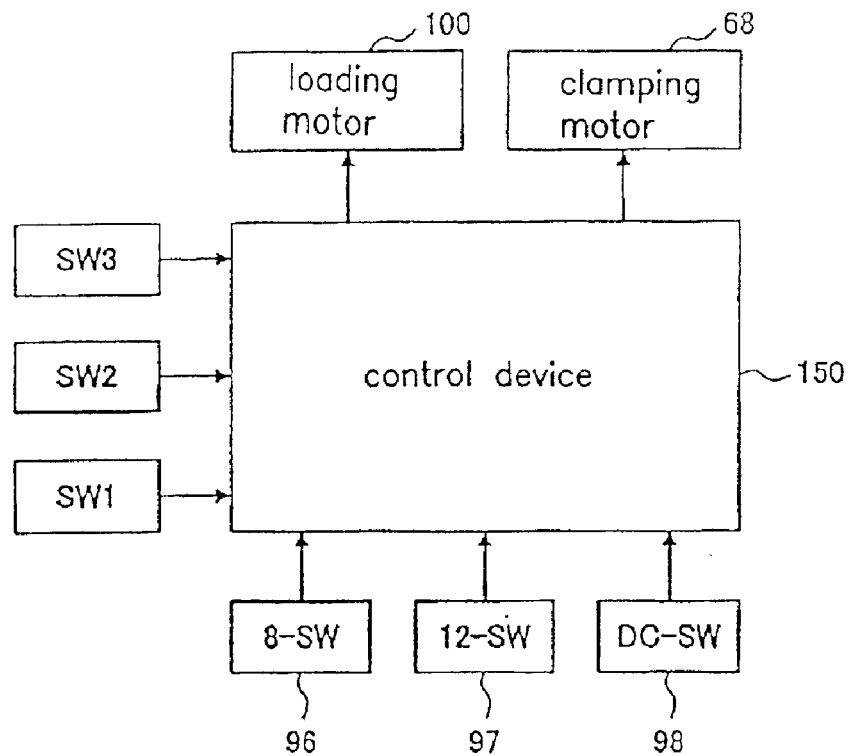
FIG. 22 is a block diagram showing the control system of the recording medium loading apparatus according to the embodiment of the invention.

In addition, referring to FIG. 3, a holder driving slider 30 is assembled on the back surface of the base body 21 in the vicinity of the second opening 23 (not shown in FIG. 3). The holder driving slider 30 is capable of moving in the arrow directions of X1 and X2 as shown by a clamping motor 68 (not shown in FIG. 3). Referring to FIG. 22, the clamping motor 68 is connected to a control device 150 that is used to control whole operations of the disc apparatus 10 and the recording-medium loading apparatus, thereby the driving control is performed.

In addition, a cam plate 31 extending upwards and downwards (the Z1 and Z2 directions as shown) is assembled at the predetermined location of the holder driving slider 30. A pair of tilted cams 32, 33 with a long-hole shape is formed on the cam plate 31. As shown in FIG. 3, each of the tilted cams 32, 33 is substantially a Z shape. Therefore, as the holder driving slider 30 is moved by the clamping motor 68 in the arrow directions of X1 and X2, the tilted cams 32, 33 are also moved in the X1 and X2 directions.

Referring to FIGS. 1, 3 and 4A for details, the first and the second disc lever driving cams 28, 29 are protrusions protruded from the base body 21 along the arrow direction of Z1. The first and the second disc lever driving cams 28, 29 are formed at locations corresponding to accommodating locations of a disc lever, which is described in detail as follows.

The holder 40 is installed between the base 20 and the base cover 120, and is assembled by a right rail 50, a left rail 51, a damper holder 59, a disc lever 60 and a disc carrier unit 70. In addition, referring to FIG. 4, the holder 40 is capable of swinging centered on a rotational axis 57 between the base 20 and the base cover 120, which is described in detail below. Furthermore, the base 20 and the base cover 120 are fixed.

The holder 40 comprises a bottom plate 41, a right sidewall 42 and a left sidewall 43 that are integrally formed by bending and folding a metal plate. There are a first opening 44, a second opening 45 and a third opening 49 formed on the bottom plate 41 of the holder 40.

The first opening 44 is formed on a location including the installing position of the turntable 24 on the base 20 and the moving position of the pick-up 26. Therefore, each disc 11, 12 or 14 is held on the turntable 24 through the first opening 22 on the base body 21. In addition, laser beams are transmitted between the pick-up 26 and each disc 11, 12 or 14 through the opening 22.

A hanging portion 46 is arranged at an edge of the second opening 45 on the holder 40. The hanging portion 46 is hung downward from a down side of the bottom plate 41 (along the Z2 direction in FIG. 3). A pair of coupling pins 47, 48 is arranged on the hanging portion 46. The hanging portion 46 protrudes from the back surface of the base 20 through the second opening 23 formed on the base 20 so that the holder 40 is assembled with the base 20. In addition, as shown in FIG. 3, the coupling pins 47, 48 arranged on the hanging portion 46 are respectively engaged with the tilted cams 32, 33 on the cam plate 31 formed on the holder driving slider 30.

Therefore, when the clamping motor 68 is driven from the status of the disc apparatus 10 shown in FIG. 3 (also shown in FIG. 4A), and the holder driving slider 30 is moved along the arrow direction of X1 in FIG. 3, the coupling pin 47 is moved relatively downward within the tilted cam 32 and the coupling pin 48 is also moved relatively downward within the tilted cam 33.

Accordingly, the holder 40 having the hanging portion 46 installed thereon is swung counterclockwise centered on the rotational axis 57 with respect to FIGS. 4A/4B. Then, the coupling pins 47, 48 reach the lower ends of the tilted cams 32, 33, and the holder 40 is in contact with the base 20 as shown in FIG. 4B.

Moreover, as the clamping motor 68 is driven from the status shown in FIG. 4B (referring to a moving-down position of the holder 40, hereinafter), and the holder driving slider 30 is moved along the arrow direction of X2 in FIG. 3, the coupling pins 47, 48 are moved relatively upward within the corresponding tilted cams 32, 33. As a result, the holder 40 is swung clockwise centered on the rotational axis 57 with respect to FIGS. 4A/4B. Then, the coupling pins 47, 48 reach the upper ends of the tilted cams 32, 33, and the holder 40 is separated from with the base 20 as shown in FIGS. 3 and 4A (referring to a moving-up position of the holder 40, hereinafter).

On the other hand, the third opening 49 is formed on a position facing the positions of the first and the second disc lever driving cams 28, 29 installed on the base 20. Therefore, when the holder 40 is moved to the lower moving position, the first and the second disc lever driving cams 28, 29 protrude from an upper portion of the bottom plate 41 through the third opening 49.

The right sidewall 42 and the left sidewall 43 are respectively formed at the right side and the left side of the bottom plate 41 having the structure mentioned above. The guards 55, 56 are respectively formed within a predetermined range over the right and the left sidewalls 42, 43 by folding and bending sidewalls 42, 43 inwards by right angles. Therefore, the two side portions of the holder 40 are substantially a U shape in a front view shown in FIG. 3.

Rails 50, 51 are respectively arranged on each sidewalls 42, 43 having guards 55, 56. More specifically, the right rail is fixed on the right sidewall 42 and the left rail 51 is fixed on the left sidewall 43. Each of the rails 50, 51, which can be made of resin, is arranged along the two sidewalls 42, 43 of the holder 40, extending long in both arrow directions of Y1 and Y2 as shown in FIG. 1.

Figure 20:
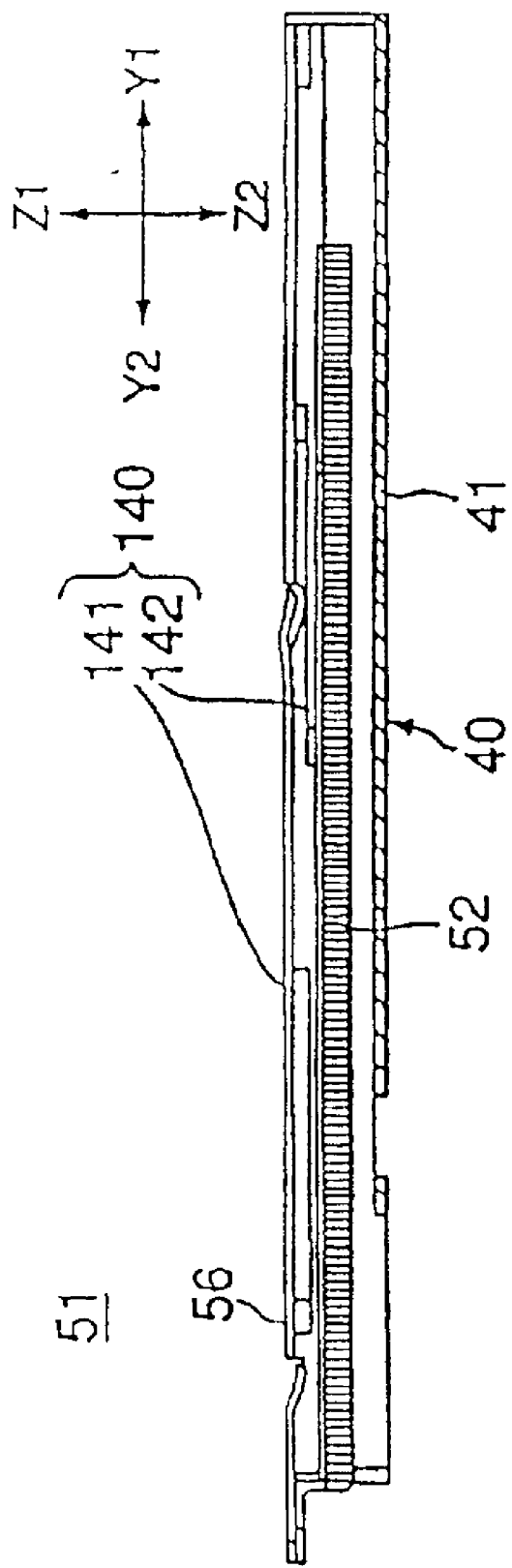
FIG. 20 is a diagram for describing the detail structure of the left rail.

Referring to FIG. 3 the cross-sections of each of the rails 50, 51 are substantially a U shape. Using the rails 50, 51 as guides, a carrier unit 70, which is described in detail below, can be moved along the arrow directions of Y1 and Y2 as shown. Referring to FIG. 20, a lock gear 52 and a carrier position detecting cam 140 are further formed on an inner wall of the left rail 51.

In FIG. 1, the lock gear 52 is formed within a moving range of the carrier unit 70. In addition, the carrier position detecting cam 140 is a cam with a two-piece structure, formed by an upper cam 141 and a lower cam 142. FIGS. 21A~21F illustrate status separating the upper cam 141 and the lower cam 142 that construct the carrier position detecting cam 140.

Figure 21A:
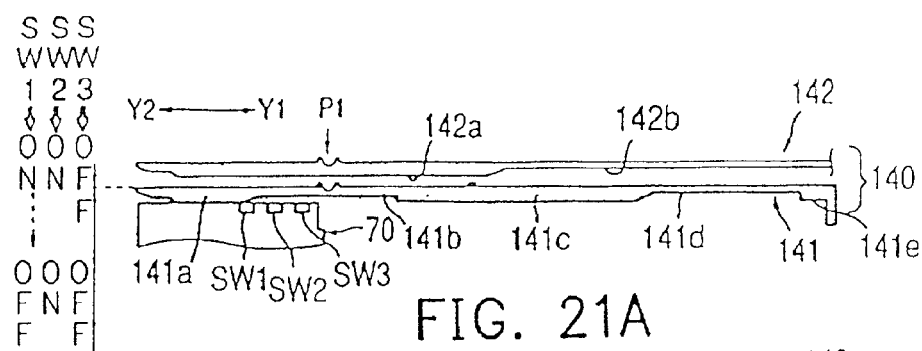
FIGS. 21A~21F are a diagrams showing the relationship of the position of the carrier unit, the carrier position detecting cam and the operation of the switches SW1~SW3.

Referring to FIGS. 21A~21F, the upper cam 141 is formed having cam shapes, including a first protrusion 141a, a first recess 141b, a second protrusion 141c, a second recess 141d and a third recess 141e subsequently formed thereon from the left side in FIG. 21A to the Y1 direction. Also, the lower cam 142 is formed having cam shapes, including a protrusion 142a and a recess 142b subsequently formed thereon from the left side in FIG. 21A to the Y1 direction. The cam shape for each of the cams 141, 142 is set to correspond to a predetermined stop position of the carrier unit 70.

Referring to FIG. 1, a cartridge lever retroceding opening 53 is formed on the right rail 50 to penetrate therethrough together with the right sidewall 42 in the arrow directions of X1 and X2, and also a disc lever opening 67 is formed on the left rail 51 to penetrate therethrough together with the left sidewall 43 in the arrow X1 and X2 directions. Moreover, the rails 50, 51 are firmly fixed on the holder 40 without displacement respective to the holder 40.

As shown in FIG. 1, the disc lever 60 comprises a lever body 61, a rotational axis 62, an engaging jaw 63 and an engaging member 66. The rotational axis 62 is installed in a standing manner at an end of the lever body 61 in the Y1 direction shown in FIG. 1, and the rotational axis 62 is rotatably supported to a bearing 64 formed on the left sidewall 43 of the holder 40. As described above, because the disc lever opening 67 is formed on the left rail 51 and the left sidewall 43, the disc lever 60 can be freely rotated within the disc lever opening 67 centered on the rotational axis 62.

The lever body 61 is substantially a plate shape and placed on the bottom plate 41 when the lever body 61 is attached to the holder 40. Accordingly, the lever body 61 is slid on the bottom plate 41 by means of the lever body 61 being rotated. Furthermore, the engaging member 66 is formed at a predetermined position of the lever body 61, and engaging member 66 is selectively engaged with the first or the second disc lever driving cam 28, 29 installed on the base 20 when the holder 40 is moved to the moving-down position.

The engaging jaw 63 is a pair of jaw plates arranged up and down, and is installed in a standing manner at another end of the lever body 61 in the Y2 direction shown in FIG. 1. The engaging jaw 63 engages with a rear portion of the disc 11 or 12 with respect to an insertion direction when the 8 cm disc or 12 cm disc is inserted and transferred in the disc apparatus 10, thereby the engaging jaw 63 achieves the function of holding the disc 11 or 12.

Referring to FIG. 2, the disc lever 60, having a structure as described above, is connected to an disk lever actuating spring 65. An end of the disc lever actuating spring 65 in the arrow direction of Y1 is connected to the holder 40, and another end in the arrow direction of Y2 is connected to the disc lever 60. From a planar view, the disc lever 60 is rotated by the disc lever actuating spring 65, counterclockwise centered on the rotational axis 62.

On the other hand, two side portions of the damper holder 59 are installed on the top portion of the holder by screwing screws to the guards 55, 56. A damper 58 is installed on the central portion of the clamp holder 59. The installation position of the damper 58 corresponds to the installation position of the turntable 24 installed on the base 20.

On the other hand, in the situation that the holder 40 is moved to the moving-up position shown in FIG. 4A, the damper 58 is separated from the turntable 24, allowing each disc 11, 12 or disc cartridge 13 is placed into the holder 40. As the each disc 11, 12 or disc cartridge 13 to be transferred into the holder 40 and the holder 40 is moved to the moving-down shown in FIG. 4B, the damper is relatively close to the turntable 24.

Next, at the time point that the disc transfer is finished, the damper 58 is in contact with the turntable 24, and each the disc 11, 12 or 14 is clamped between the damper 58 and the turntable 24. At this time, the damper 58 provides a clamp magnet and the turntable 24 provides a clamp yoke. Accordingly, each disc 11, 12 or 14 is firmly clamped between the damper 58 and the turntable 24 by means of a magnetic force provided by the clamp magnet and absorption from the clamp yoke.

Figure 5:
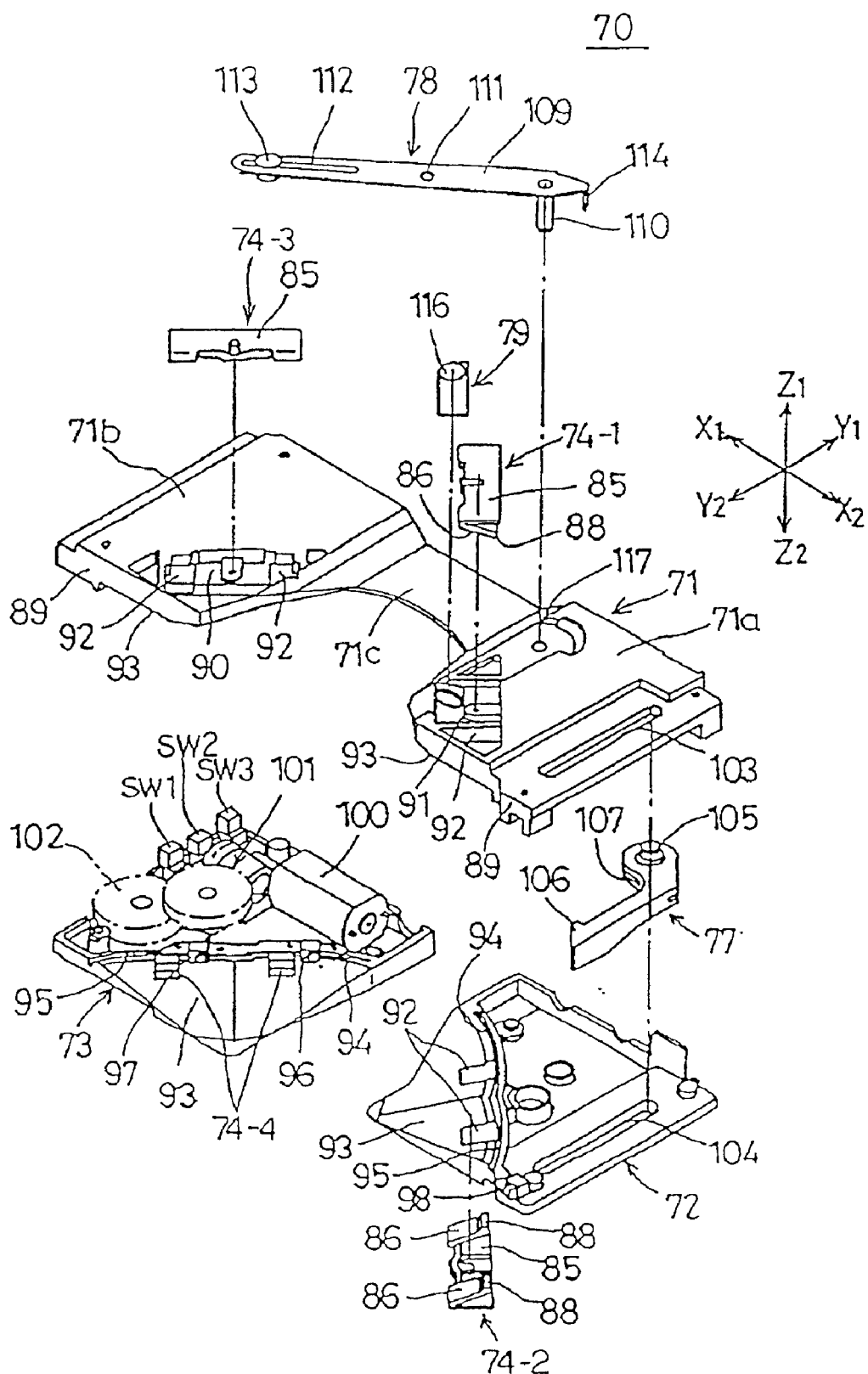
FIG. 5 is a explosive view of the carrier unit in the disc apparatus installing a recording medium loading apparatus according to one embodiment of the invention.

Next, FIGS. 1 to 4 together with FIG. 5 are used for describing the carrier unit 70. The carrier unit 70 forms a structure for holding each disc 11, 12 and disc cartridge 13, which is movably arranged on the holder 40 in the arrow directions of Y1 and Y2. Therefore, each disc 11, 12 and the disc cartridge 13 is transferred in the insertion direction by means of the carrier unit 70 moving in the arrow direction of Y1 in a status holding the disc 11, 12 or the disc cartridge 13. In addition, each disc 11, 12 and the disc cartridge 13 is transferred in the eject direction by means of the carrier unit 70 moving in the arrow direction of Y2 in a status holding the disc 11, 12 or the disc cartridge 13.

As shown in FIG. 5, the carrier unit 70 is formed by an upper half portion 71, a right lower half portion 72, a left lower half portion 73, clip disc 74-1~74-4, cartridge lever 77 and a shutter lever 78 etc. The half portions 71~73 are made of resin and cooperate with one another to form a carrier body. The upper half portion 71 is formed by connecting a right portion 71a and a left portion 71b with a connecting portion 71c. An assembling recess 91 is formed on the right portion 71a for installing the first clip disc 74-1 and a plate spring 79, and an assembling recess 90 is formed on the left portion 71b for installing the third clip disc 74-3.

A cartridge lever guiding groove 103, extending in the arrow directions of Y1 and Y2, is formed in the vicinity of the right side of the right portion 71a. An axis 105 of the cartridge lever 77 is movably engaged with the cartridge lever guiding groove 103. The cartridge lever 77 is used when the disc cartridge 13 is transferred, and is described in detail below.

In addition, an axis hole 117 is formed on the right portion 71a, and the shutter lever 78 is assembled through the axis hole 117. The shutter lever functions to open and close a shutter 150 installed on the disc cartridge 13 when the disc cartridge 13 is inserted to the disc apparatus 10.

The shutter lever 78 has an axis portion 110 protruded downward in the vicinity of an end of a plate-shaped lever body 109, and the shutter lever 78 is assembled onto the upper half portion 71 by means of the axis portion 110 being rotatably inserted into the axis hole 117. In addition, as shown in FIG. 2, a shutter lever actuating spring 115 is installed at a position such that the axis portion 110 is inserted into the axis hole 117.

One end of the shutter lever actuating spring 115 is engaged with a spring connecting portion 114 formed on the end of the lever body 109, and another end is engaged with a predetermined position of the right portion 71a. Accordingly, the shutter lever 78 is rotated counterclockwise with respect to FIG. 2 centered on the axis portion 110 by the shutter lever actuating spring 115.

In addition, a long hole 112, extending along the longitudinal direction of the lever body 109, is formed in the vicinity of the other end of the lever body 109, and a shutter driving pin 113 is movably assembled in the long hole 112. As shown in FIG. 3, the shutter driving pin 113 is protruded downward from the lever body 109 for engaging with the shutter 15 installed on the disc cartridge 13 (shown in FIG. 18, 19).

The shutter driving pin 113 is also engaged with a slit 126 formed on the base cover 120. Accordingly, when the disc cartridge 13 is inserted to or ejected from the disc apparatus 10, the shutter 15 is opened and closed because the shutter driving pin 113 is restrictively moved within the positions of the long hole 112 and the slit 126 as the shutter lever 78 is rotated.

Furthermore, an engaging hole 111 is formed at a center position of the lever body 109. Referring to FIGS. 13 to 19, the engaging hole 111 is engaged with the plate spring 79 installed on the upper half portion 71 at a time point that the shutter 15 is rotated to be completely opened when the disc cartridge 13 is inserted. More specifically, the engaging hole 111 is engaged with a protruded portion 116 formed on the plate spring 79. Therefore, after the shutter 15 is completely opened, the shutter lever 78 can prevent the shutter 15 from being rotated to its closed direction due to the actuating force of the shutter lever actuating spring 115 and the engaging force of the plate spring 79, and therefore the shutter 15 maintains an opened state.

Figure 18:
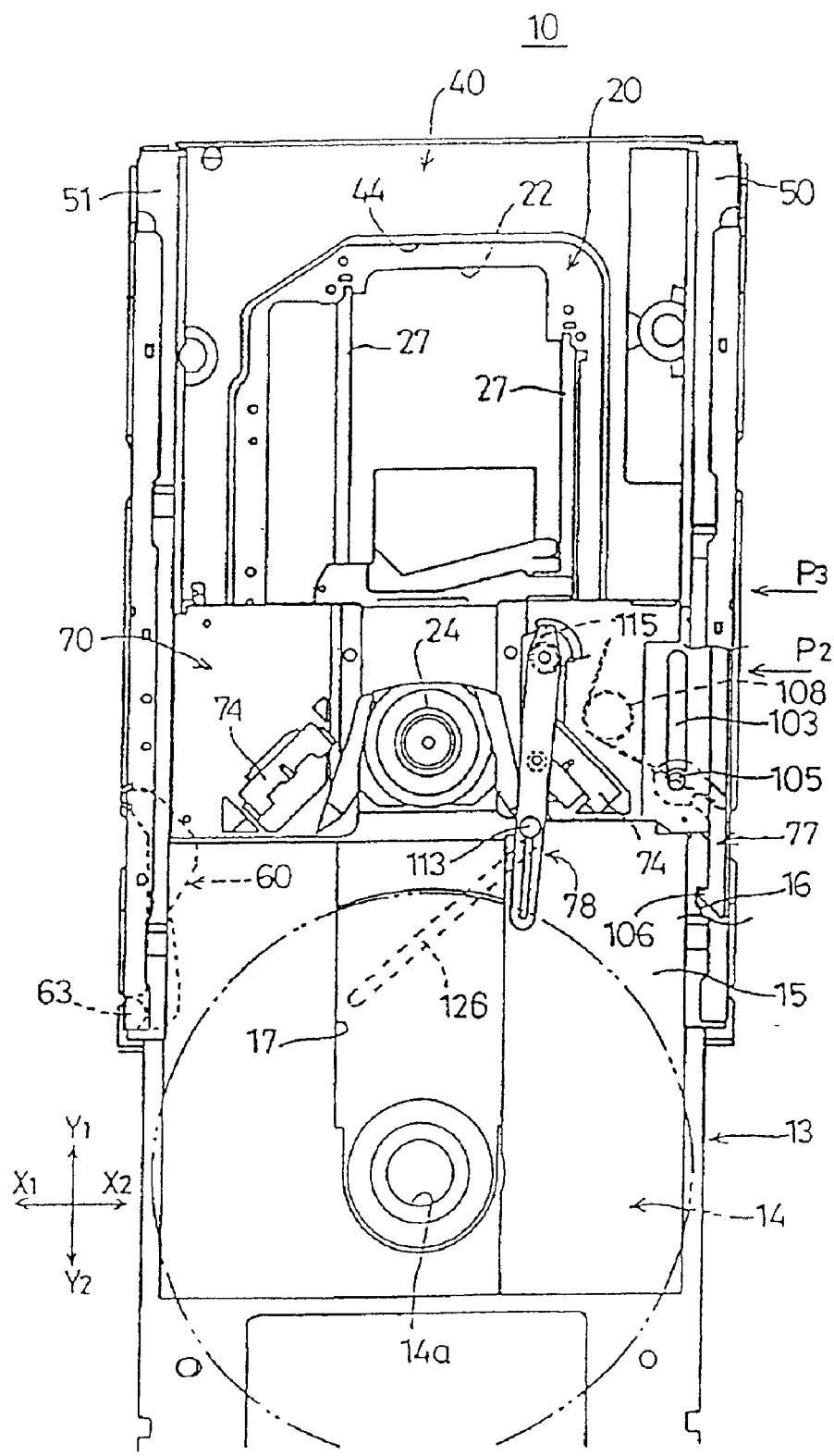
FIG. 18 is a diagram of the disc cartridge inserted to the loading start position in the disc apparatus installing a recording medium loading apparatus according to one embodiment of the invention.

Referring to FIG. 18, due to the move toward the ejecting direction (the arrow direction of Y2 as shown) of the cartridge unit 70, the shutter driving pin 113 is engaged with the slit 126 again when the disc cartridge 13 is ejected from the disc apparatus 10. Accordingly, the shutter driving pin 113 begins to move restrictively within the positions of the long hole 112 and the slit 126 by the ejecting operation of the disc cartridge 13, and thereby the engagement between the engaging hole 111 and the plate spring 79 is released. Then, the shutter lever 78 is rotated clockwise and therefore the shutter 15 is closed.

On the other hand, referring to FIG. 5, the lower right half portion 72 is assembled under the right portion 71a forming the upper half portion 71. A cartridge lever guide groove 104, extending in the arrow directions of Y1 and Y2, is formed in vicinity of the right side of the right lower half portion 72. A axis portion 105 (not shown) located under the cartridge lever 77 is movably engaged with the cartridge lever guide groove 104.

Accordingly, the axis portion 105 protruded above and below the cartridge lever 77 is movably and rotatably engaged with the cartridge lever guide grooves 103, 104 under the condition that the right lower half portion 72 is fixed onto the upper half portion 71. Namely, the cartridge lever 77 is capable of moving along the insertion/remove directions (the arrow directions of Y1 and Y2 in FIG. 5) of each disc 11, 12 or 14 with spaces enclosed by the cartridge lever guide grooves 103, 104, and the cartridge lever 77 is capable of rotating centered on the axis portion 105.

A cartridge lever actuating spring 108 is installed on the cartridge lever 77. One end of the cartridge lever actuating spring 108 is connected to a spring connecting portion 107 formed on the cartridge lever 77, and the other end is connected to a predetermined position of the right lower half portion 72. Therefore, an actuating force is acted on the cartridge lever 77 within the cartridge lever guide grooves 103, 104.

Furthermore, a disc facing surface 93 is formed on the right lower half portion 72, and an 8 cm-disc curve wall 94 and a 12 cm-disc curve wall 95 are provided in a standing manner on the outer circumference of the disc facing surface 93. The 8 cm-disc curve wall 94 has a curvature radius of 4 cm, and the 12 cm-disc curve wall 95 has a curvature radius of 6 cm.

When the 8 cm disc 11 is inserted to the carrier unit 70, a front end in the insertion direction of the 8 cm disc 11 is in contact with the curve wall 94 for the 8 cm disc, and additionally a front end in the insertion direction of the 12 cm disc 12 is contact with the 12 cm-disc curve wall 95 when the 12 cm disc 12 is loaded into the carrier unit 70. As described above, the disc curve walls 94, 95 have curvature radii respectively corresponding to the radii of the loaded discs 11, 12, and the 8 cm-disc curve wall 94 with a small curvature radius is arranged in the arrow direction of Y1 with respect to the 12 cm-disc curve wall 95 with a large curvature radius.

More over, the 8 cm-disc curve wall 94 and the 12 cm-disc curve wall 95 with configurations mentioned above are also installed on the right portion 71a, the left portion 71b and the left lower half portion 73 (disc curve walls 94, 95 formed on the right portion 71a and the left portion 71b are not shown in FIG. 5).

Accordingly, the 8 cm disc 11 is in contact with the 8 cm-disc curve wall 94 when the 8 cm disc 11 is inserted to the carrier unit 70. Referring to FIGS. 10A, 10B and 11A~11C, as the 8 cm disc 11 is just pushed to contact with the 8 cm-disc curve wall 94, the position of the 8 cm disc 11 with respect to the carrier unit 70 can be determined because the shape of the 8 cm-disc curve wall 94 corresponds to the outer circumference of the 8 cm disc 11.

Similarly, when the 12 cm disc 12 is inserted to the carrier unit 70, the 12 cm disc 12 is contact with the 12 cm-disc curve wall 95 rather than the 8 cm-disc curve wall 94. Accordingly, as the 12 cm disc 12 is just pushed to contact with the 12 cm-disc curve wall 95, the position of the 12 cm disc 12 with respect to the carrier unit 70 can be determined.

The disc facing surface 93 is a tilt surface tilted from the disc curve walls 94, 95 toward the arrow direction of Y2 in FIG. 5. Therefore, each of the discs 11 and 12 is guided by the disc facing surface 93 and pushed to contact with the disc curve walls 94, 95 when the discs 11 and 12 are loaded into the carrier unit 70. Accordingly, the position determination process of the discs 11 and 12 with respect to the carrier unit 70 can be easily determined.

Figure 10A:
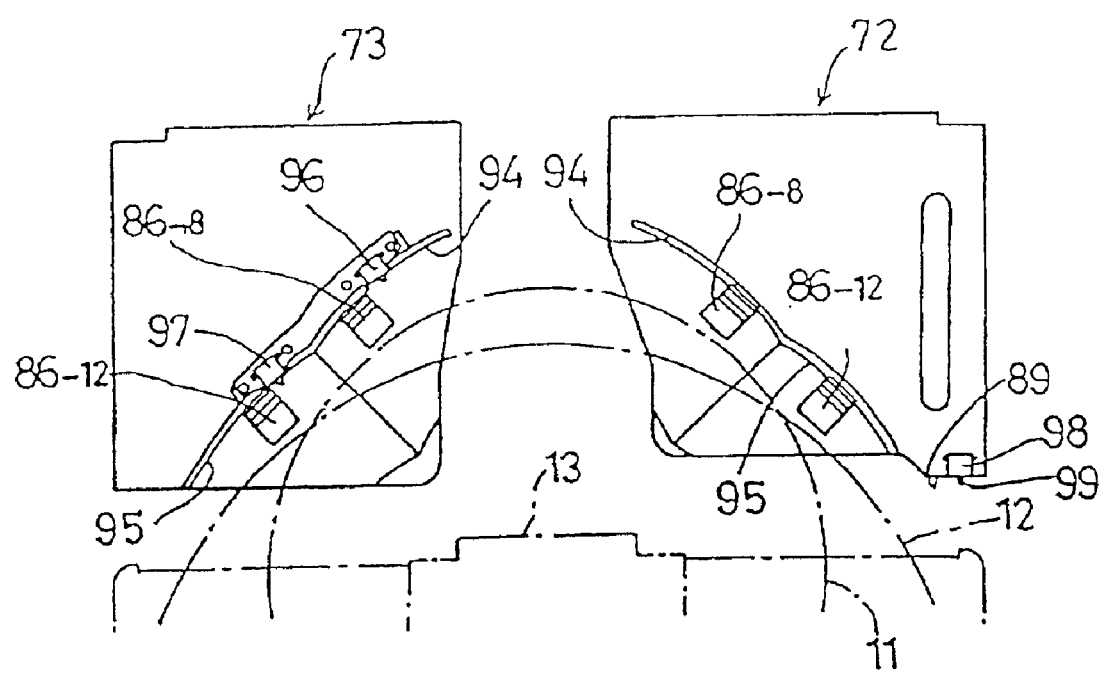
FIGS. 10A and 10B are diagrams for explaining the disc detecting switch and the disc curve wall formed on the carrier unit 70.
Figure 10B:
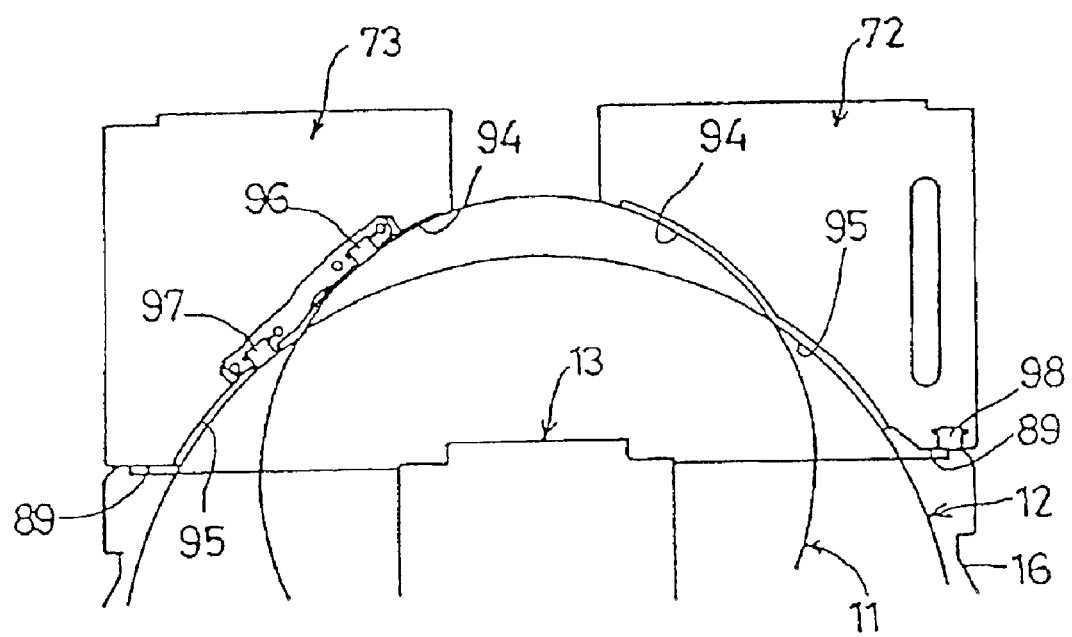

Furthermore, referring to FIGS. 10A to 10B, a front end portion of the disc cartridge 13 is in contact with a front surface 89 of the carrier unit 70 when the disc cartridge 13 is inserted into the apparatus 10. Therefore, due to the contact, the position determination of the disc cartridge 13 with respect to the carrier unit 70 can be made. In addition, a disc cartridge detecting switch 98 is installed on the right lower half portion 72, and has a contact portion 99 protruded from the front surface 89 of the carrier unit 70 (referring to FIG. 10A). Therefore, the inserting process until the disc cartridge 13 is in contact with carrier unit 70 can be detected by the output of the disc cartridge detecting switch 98. Moreover, the disc cartridge detecting switch 98 is further connected to the control device 150 (referring to FIG. 22).

Referring to FIG. 5, a loading motor 100, a gear group 101 and a first, a second and a third position detecting switches (SW1, SW2 and SW3, hereinafter) are installed on the left lower half portion 73. The loading motor 100 drives the gear group 101 by meshing to the gear group 101. In addition, a gear 102 located at the outmost portion of the gear group 101 protrudes outward from the left lower half portion 73. The gear 102 is meshed to the lock gear 52 formed on the left rail 51 assembled on the holder 40 in the status wherein the carrier unit 70 is assembled to the holder 40.

Accordingly, by means of the loading motor 100 being driven and the gear 102 meshed to the lock gear 52 being rotated via the gear group 101, the carrier unit 70 is selectively moved in the arrow direction of Y1 (the insertion direction) or in the arrow direction of Y2 (the ejecting direction) within the holder 40. Additionally, as the carrier unit 70 holds the disc 11, 12 or the disc cartridge 13 and the loading motor 100 is driven, the disc 11, 12 or the disc cartridge 13 together with the carrier unit 70 are transferred in the arrow direction of Y1 (the insertion direction) or in the arrow direction of Y2 (the ejecting direction). Moreover, the loading motor 100 is connected to the control device 150 (referring to FIG. 22) for performing the driving control.

As described above, the 8 cm-disc curve wall 94 and the 12 cm-disc curve wall 95 are also installed on the left lower half portion 73. As shown in FIGS. 10A, 10B and 11A to 11C, an 8 cm-disc detecting switch 96 and a 12 cm-disc detecting switch 97 are respectively installed on the 8 cm-disc curve wall 94 and the 12 cm-disc curve wall 95. Both of the disc detecting switches 96, 97 are also connected to the control device 150.

The 8 cm-disc detecting switch 96 outputs a signal in response to the 8 cm disc 11 being inserted to a predetermined loaded position (the position in contact with the 8 cm-disc curve wall 94) in the carrier unit 70, and the 12 cm-disc detecting switch 97 also outputs a signal when the 12 cm disc 12 is inserted to a predetermined loaded position (the position in contact with the 12 cm-disc curve wall 95) in the carrier unit 70. Therefore, from the output signal out of the disc detecting switches 96, 97, the control device 150 can detect that each of the discs 11 and 12 is loaded to the corresponding predetermined loaded position in the carrier unit 70.

Referring to FIG. 22, each of the switches SW1~SW3 can be ON/OFF by pressing a switch knob, and is respectively connected to the control device 150. Of the three switches SW1~SW3, the heights of the switches SW1 and SW3 are a little higher than that of the switch SW2 arranged in middle of the switches SW1 and SW3. In addition, the switch SW3 is engaged with the upper cam 141 of the carrier position detecting cam 140 formed on the left rail 51 and the switch SW2 is engaged with the lower cam 142 when the carrier unit 70 is assembled to the holder 40. Accordingly, the switches SW1, SW3 are ON/OFF corresponding to the cam shapes of the upper cam 141 when the carrier unit 70 is moved, and the switch SW2 is ON/OFF corresponding to the cam shapes of the lower cam 142 when the carrier unit 70 is moved.

Next, the first to the fourth clip disc 74-1~74-4 assembled on the carrier unit 70 are described as follows. Furthermore, in the embodiment of the present invention, the four clip discs 74-1~74-4 are assembled, but they are the same structure. Therefore, in the following description, all of the four clip discs 74-1~74-4 are termed clip discs 74 if no specified situation is pointed out.

FIG. 6 shows an enlarged structure for each clip disc 74. The clip disc 74 is made of resilient resin material and consists of a pair of tongue pieces 86. A through hole 85*a* for screwing a screw (not shown) therethrough is formed on a fixing portion 85 of each clip disc 74. The screws (not shown) are screwed through the through holes 85 such that the right portion 71*a*, the left portion 71*b*, the right lower half portion 72 and the left lower half portion 73 are all screwed together. Thereby, each of the clip discs 74-1~74-4 are fixed on the carrier unit 70.

The tongue pieces 86 are tilted and extended in front of the fixing porting 85 by bending and folding two side portions of the fixing porting 85. Therefore, the clip disc 74 is substantially a V shape from its side view. Furthermore, a touch portion 88 is protruded from a front end of each tongue piece 86.

As shown in FIG. 5, the first clip disc 74-1 is installed on the assembling recess 91 from the top of the right portion 71*a*. At this time, the tongue pieces 86 of the first clip disc 74-1 are located at a lower position. In addition, an opening 92 is formed on a position of the assembling recess 91, which faces the tongue piece 86, thereby the tongue piece 86 is protruded to the disc facing surface 93 through the opening 92.

The second clip disc 74-2 is installed on the assembling recess (not shown) formed on the right lower half portion 72 from the bottom. At this time, the tongue pieces 86 of the second clip disc 74-2 are located at an upper position. In addition, an opening 92 is formed on a position of the assembling recess, which faces the tongue piece 86, thereby the tongue piece 86 is protruded to the disc facing surface 93 through the opening 92.

At this time, the assembling positions of the first clip disc 74-1 and the second clip disc 74-2 are set in an opposite manner. More specifically, referring to FIG. 7A, the first clip disc 74-1 and the second clip disc 74-2 are arranged such that the corresponding tongue pieces 86 resist each other, and the contact portions 88 formed on the front ends of the tongue pieces 86 utilize the actuating force of the tongue pieces 86 to contact each other. At this time, the contact portions 88 of tongue pieces 86 contact by means of gradually approaching to the insertion direction (the arrow direction of Y1) of the disc 11, 12.

According to the structure above, when the 8 cm disc 11 or the 12 cm disc 12 is inserted to the carrier unit 70, the disc 11 or 12 is inserted between the first clip disc 74-1 and the second clip disc 74-2. Referring to FIG. 7B, the right front end in the insertion direction of the discs 11, 12 is clamped between the touch portion 88 of the first clip disc 74-1 and the touch portion 88 of the second clip disc 74-2. Thereby, the discs 11, 12 can be firmly held by the first clip disc 74-1 and the second clip disc 74-2.

The third clip disc 74-3 is installed on the assembling recess 90 from the top of the left portion 71*b*. At this time, the tongue pieces 86 of the third clip disc 74-3 are located at a lower position. In addition, an opening 92 is formed on a position of the assembling recess 90, which faces the tongue piece 86, thereby the tongue piece 86 is protruded to the disc facing surface 93 of the left portion 71*b* through the opening 92.

The fourth clip disc 74-4 is installed on the assembling recess (not shown) formed on the left lower half portion 73 from the bottom. At this time, the tongue pieces 86 of the fourth clip disc 74-4 are located at an upper position. In addition, an opening 92 is formed on a position of the assembling recess, which faces the tongue piece 86, thereby the tongue piece 86 is protruded to the disc facing surface 93 on the left lower half portion 73 through the opening 92.

At this time, the assembling positions of the third clip disc 74-3 and the fourth clip disc 74-4 are set in an opposite manner, which is similar to the opposite arrangement of the first clip disc 74-1 and the second clip disc 74-2. In the opposite status, the contact portions 88 formed on the tongue pieces 86 of the third clip disc 74-3 and the fourth clip disc 74-4 utilize the actuating force of the tongue pieces 86 to contact each other. At this time, the contact portions 88 of tongue pieces 86 contact by means of gradually approaching to the insertion direction (the arrow direction of Y1) of the disc 11, 12.

According to the structure above, when the 8 cm disc 11 or the 12 cm disc 12 is inserted to the carrier unit 70, the disc 11 or 12 is inserted between the third clip disc 74-3 and the fourth clip disc 74-4. Then, the left front end in the insertion direction of the discs 11, 12 is clamped between the touch portion 88 of the third clip disc 74-3 and the touch portion 88 of the fourth clip disc 74-4. Thereby, the discs 11, 12 can be firmly held by the third clip disc 74-3 and the fourth clip disc 74-4.

Now, focusing on and describing the assembling positions of the tongue pieces 86 formed on each clip disc 74 accompanying with FIGS. 10A and 10B, as described above, a pair of the tongue pieces 86 is respectively formed on the clip disc 74, in the status wherein the clip disc 74 is assembled to the carrier unit 70, and the assembling position of one of the tongue pieces 86 is set opposite to the 8 cm-disc curve wall 94 (this tongue piece 86 refers to a tongue piece 86 for the 8 cm-disc tongue piece 86-8 in a specified case, hereinafter). Additionally, the assembling position of another of the tongue pieces 86 is set opposite to the 12 cm-disc curve wall 95 (this tongue piece 86 refers to a tongue piece 86 for the 12 cm-disc tongue piece 86-12 in a specified case, hereinafter).

Accordingly, in the case of the 8 cm disc 11 being inserted to the carrier unit 70, the 8 cm disc 11 is held by the 8 cm-disc tongue piece 86-8, and in the case of the 12 cm disc 12 is inserted to the carrier unit 70, the 12 cm disc 12 is held by the 12 cm-disc tongue piece 86-12. As the carrier unit 70 is moved in the status wherein the discs 11, 12 are respectively held by the 8 cm-disc tongue piece 86-8 and the 12 cm-disc tongue piece 86-12, each of the discs 11, 12 is transferred between the position for inserting/removing (referring to eject position, hereinafter) and the loaded position with respect to the carrier unit 70.

When the discs 11, 12 are transferred, the outer circumferences (more specially, the front edge in the insertion direction) of the discs 11, 12 are held by the 8 cm-disc tongue piece 86-8 and the 12 cm-disc tongue piece 86-12. An area not used for performing a recording or reproducing process is formed with a predetermined range at the outer circumference of each disc 11, 12, and the contact portions 88 of the disc tongue pieces 86-8, 86-12 are in contact with the area not used for performing the recording or reproducing process. Therefore, this prevents the areas for performing the recording/reproducing process of the discs 11, 12 from damage when the discs 11, 12 are transferred.

Moreover, as described above, because the discs 11, 12 are held by the disc tongue pieces 86-8, 86-12 when the discs 11, 12 are transferred, relative displacements between the disc tongue pieces 86-8, 86-12 and the discs 11, 12 don't occur, thereby a highly accurate transfer process can be performed.

However, if the operator of the disc apparatus 10 still holds the disc 11, 12 after the disc 11, 12 is inserted and then held by the carrier unit 70, the drawing force is acted on the disc 11, 12. If the operator processes a wrong operation, the disc 11, 12 is promptly detached from the carrier unit 70, and the clamp operation may fail. Therefore, even if the drawing force to some degree is acted on the disc 11, 12 after insertion, that the disc 11, 12 is not promptly detached from the clip discs 74 is demanded.

In the embodiment, for solving the problem above, the tongue pieces 86 installed on the clip disc 74 gradually close in the insertion direction (the Y1 arrow direction), and then clamp the outer circumferences of the discs 11, 12. Therefore, in the holding status shown in FIG. 7B and in the case that a force in the drawing direction (the drawing force) from the carrier unit 70 is applied to the discs 11, 12, a force in the B arrow direction is created to act on the tongue pieces 86 due to the drawing force. Accordingly, after the carrier unit 70 (the clip disc 74) holds the discs 11, 12, even though the drawing force is applied to the discs 11, 12 by mistake, the discs 11, 12 can be prevented from detaching from the carrier unit 70 (the clip disc 74).

Moreover, according to the embodiment of the invention, the discs 11, 12 are clamped by a pair of the clip discs arranged up and down (the first clip disc 74-1 and the second clip disc 74-2, the third clip disc 74-3 and the fourth clip disc 74-4). However, as shown in FIGS. 8A and 8B, each of the discs 11, 12 can also be clamped by only one clip disc 74. In such a case, it is advantageous that the carrier unit 70 can become more compact and smaller because the number of the clip discs is reduced and assembling space is saved In the embodiment of the invention, the disc detecting switches 96, 97 are installed on the disc curve walls 94, 95. Consequently, the installed positions of the disc detecting switches 96, 97 can also be located at positions opposite to the clip discs 74. FIGS. 9A and 9B show examples where the disc detecting switches 96, 97 are arranged to the positions opposite to the clip discs 74.

Each of the disc detecting switches 96, 97 has a contact portion 99, which is pushed by the insertion of the discs 11, 12. With respect to FIGS. 9A and 9B, the contact portion 99 can be moved up and down, and is actuated upward due to a spring (not shown) installed inside each disc detecting switches 96, 97. Therefore, as shown in FIG. 9A, the disc detecting switches 96, 97 are assembled such that the contact portion 99 is opposite to the touch portion 88 of the clip disc 74.

Accordingly, as shown in FIG. 9B, as the discs 11, 12 are inserted to the carrier unit 70, the discs 11, 12 are clamped between the clip discs 74 and the disc detecting switches 96, 97. Furthermore, the discs 11, 12 can be strongly held between the clip discs 74 and the disc detecting switches 96, 97 because the tongue pieces 86 are elastic and the contact portion 99 is actuated upwards. As a result, according to the configuration in FIG. 9B, because in addition to the switching function, the disc detecting switches 96, 97 can achieve the function equivalent to the second clip disc 74-2 installed on the right lower half portion 72, the part number can be reduced and the carrier unit 70 can become compact and smaller.

Turning to FIG. 1 again for further description, the carrier unit 70, having the structure mentioned above, is movably installed in the holder 40. The base cover 120 is assembled over the upper portion of the holder 40. The base cover 120 is formed from a metal plate by press working, comprising a ceiling plate 121, a right side plate 122 and a left side plate 123.

A first and a second recess 124, 125 are formed on the ceiling plate 121, and particularly a slit 126 is formed on the first recess 124. In addition, axis holes 127 are respectively formed on the right side plate 122 and the left side plate 123 for axially receiving the rotational axis 57 formed on the holder 40. The rotational axis 57 and the axis hole 127 at the left side are not shown in FIG. 1. The base cover 120, having the structure mentioned above, is fixed on the base 20, and therefore the position of the base cover 120 is not changed with respect to the base 20. Additionally, referring to FIGS. 4A and 4B, the holder 40 can be swung between the base 20 and the base cover 120.

Moreover, a front bezel 130 is assembled in front of the disc apparatus 10 (referring to FIG. 2 and FIGS. 4A and 4B). An insertion opening 133 is formed on the front bezel 130, and each of the discs 11, 12 and the disc cartridge 13 can be inserted to and removed from the disc apparatus 10 through the insertion opening 133.

Caps 131, 132 for opening and closing by an open/close mechanism (not shown) are installed on the insertion opening 133. The insertion opening is closed by the caps 131, 132 when the discs 11, 12 and the disc cartridge 13 are not inserted to or removed from the disc apparatus 10, for preventing dust from entering the disc apparatus 10.

Next, the operations of the recording medium loading apparatus having the structure above is described in detail as follows. As shown in FIG. 22, the 8 cm-disc detecting switch 96 (referring to 8-SW96, hereinafter), the 12 cm-disc detecting switch 97 (referring to 12-SW97, hereinafter), the disc cartridge detecting switch 98 (referring to DC-SW98, hereinafter), the clamping motor 68, the loading motor 100 and the switches SW1~SW3 are connected to the control device 150. Then, the clamping 40 motor 68 and the loading motor 100 are controlled to drive based upon signals from the switches 96, 97, 98 and the switches SW1~SW3. At this time, the control device 150 performs a control operation shown in FIGS. 23 to 26. The concrete control operation executed by the control device 150 is described below.

Figure 23:
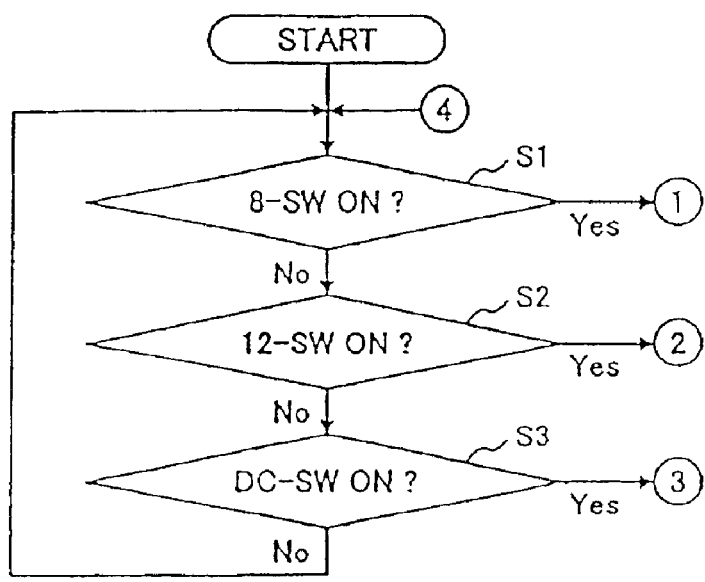
FIG. 23 is a flow chart for explaining the transfer control process executed by the control device (I)

As the control process shown in FIG. 23 starts, in step 1 (step is referring to "S" in the drawings), the control device 150 determines whether the 8 cm disc 11 is inserted to the carrier unit 70 based upon the output signal of the switch 8-SW96. Then, the process in FIG. 24 begins if the switch 8-SW96 is ON, i.e., the control device 150 determines the 8 cm disc 11 is inserted to the carrier unit 70. In addition, proceed to step 2 (S2) if the switch 8-SW96 is OFF, i.e., the control device 150 determines the 8 cm disc 11 is not inserted to the carrier unit 70.

In step 2 (S2), the control device 150 determines whether the 12 cm disc 12 is inserted to the carrier unit 70 based upon the output signal of the switch 12-SW97. Then, the process in FIG. 25 begins if the switch 12-SW97 is ON, i.e., the control device 150 determines the 12 cm disc 12 is inserted to the carrier unit 70. In addition, proceed to step 3 (S3) if the switch 12-SW97 is OFF, i.e., the control device 150 determines the 12 cm disc 12 is not inserted to the carrier unit 70.

In step 3 (S3), the control device 150 determines whether the disc cartridge 13 is inserted to the carrier unit 70 based upon the output signal of the switch DC-SW98. Then, the process in FIG. 26 begins if the switch DC-SW98 is ON, i.e., the control device 150 determines the disc cartridge 13 is inserted to the carrier unit 70. In addition, return to step 1 (S1) again if the switch DC-SW98 is OFF, i.e., the control device 150 determines the disc cartridge 13 is not inserted to the carrier unit 70.

FIG. 2 shows a status for a negative decision ("NO" is determined) in any one of the step 1~step 3. The status indicates discs 11, 12 and the disc cartridge 13 is not inserted to the disc apparatus 10, and more concretely FIG. 2 and FIGS. 21A~21F show this status. At this time, the carrier unit 70 moves to the position in the arrow Y2 direction, referring to the eject position P1 hereinafter.

When the carrier unit 70 is at the eject position P1, the switch SW1 is engaged with the first protrusion 141a of the upper cam 141, the switch SW2 is engaged with the first protrusion 142a of the lower cam 142, and the switch SW3 is opposite to the first recess 141b of the upper cam 141. Accordingly, the ON/OFF status for the switches SW1~SW3 is [SW1, SW2, SW3]=[ON, ON, OFF].

Furthermore, in the following description, the ON/OFF status for the switches SW1~SW3 is represented by the foregoing shown bracket, in which the left one represents the status of the switch SW1, the middle one represents the status of the switch SW2, and the right one represents the status of the switch SW3.

Figure 11A:
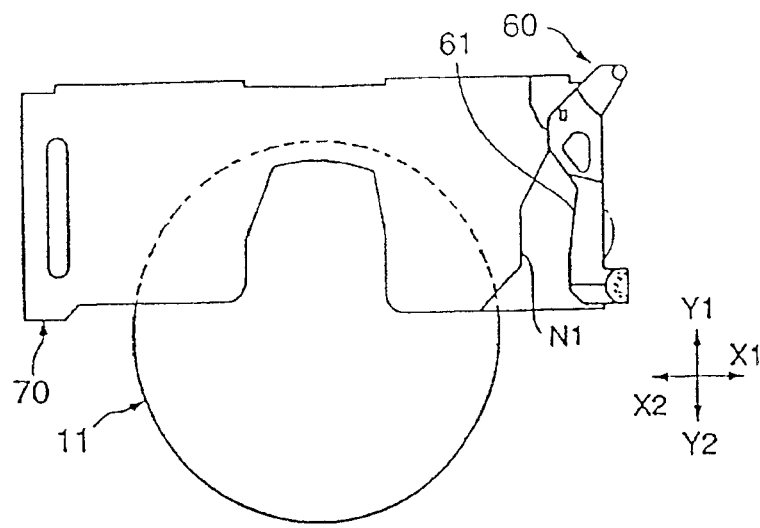
FIGS. 11A~11C are diagrams for explaining the operation of the disc lever.

In addition, as described above, when the carrier unit 70 is at the eject position P1, the lever body 61 of the disc lever 60 is in contact with a graded cam portion N1 formed inside the carrier unit 70 as shown in FIG. 11A, which will be described in detail below. Thereby, the disc lever 60 resists the actuating force of the disc lever actuating spring 65, and then retrocedes to a position without interfering with the movement of the carrier unit 70. In addition, the cartridge lever 77 is capable of displacing in the arrow Y1, Y2 directions with respect to the carrier unit 70 by means of the axis portion 105 being moved in the cartridge lever guide grooves 103, 104. Furthermore, the cartridge lever 77 is actuated by the cartridge lever actuating spring 108 in the arrow Y2 direction.

Accordingly, when the carrier unit 70 is at the eject position P1, an engaging jaw 106 formed on the cartridge lever 77 is engaged with a cartridge lever retroceding cam 54 assembled on the right rail 50. Then, when the carrier unit 70 is moved to the eject position P1, the axis portion 105 is restrictively located within the cartridge lever guide grooves 103, 104 in the arrow Y1 direction.

A tilted surface is formed on the cartridge retroceding cam 54, and the engaging jaw 106 of the cartridge lever 77 is engaged with tilted surface. Therefore, as the cartridge lever 77 pushes the tilted surface, the engaging jaw 106 resists the actuating force of the cartridge lever actuating spring and displaces along the tilted surface, thereby the cartridge lever 77 is slightly rotated counterclockwise centered on the axis portion 105.

However, a cover N2 (a portion of the cover N2 is shown in FIG. 2) of the disc apparatus 10 is arranged on the outside (in the arrow X2 direction) of the cartridge lever 77. Therefore, the rotation toward the counterclockwise direction of cartridge lever 77 is further restricted by means of the outer side surface of the cartridge lever 77 being contact with the cover N2.

Now, focus on the position of the cartridge lever 77 with respect to the carrier unit 70 when the carrier unit 70 is at the eject position P1. As described above, when the carrier unit 70 is at the eject position P1, the axis portion 105 is restrictively located within the cartridge lever guide grooves 103, 104 in the arrow Y1 direction because the cartridge lever 77 is in contact with the cartridge lever retroceding cam 54 and the cover N2.

Therefore, the cartridge lever 77 is also displaced in the arrow Y1 direction with respect to the carrier unit 70. As a result, even though the carrier unit 70 is at the eject position P1, the cartridge lever 77 doesn't protrude from the front surface 89 of the carrier unit 70 in the arrow Y2 direction.

For a disc apparatus using a conventional tray, the tray extends forward from the disc apparatus in the ejecting status, increasing the installation space and resulting in tray damage. However, according to the disc apparatus 10 of the invention, even if in the ejecting status, it never protrudes from the front of the disc apparatus 10. Therefore, when the disc apparatus 10 is installed, the installation space can be saved and occurrence of malfunction can be avoided.

On the other hand, the shutter lever 78 is at a position guided in the slit 126 (omitted in FIG. 2) formed on the base cover 120 and rotated clockwise. In the status, the shutter driving pin 113 is located at the engaging position engaged with the shutter 15 formed on the disc cartridge 13.

As shown in FIG. 4A, when the carrier unit 70 is at the eject position P1, the holder 40 moves to the moving-up position. When the holder 40 is at the moving-up position, the carrier unit 70 faces to the insertion opening 133 of the front bezel 130, allowing the insertion of the discs 11, 12 and the disc cartridge 13.

In the ejecting status of the disc apparatus 10 shown in FIG. 2, as the 8 cm disc 11 is inserted to the carrier unit 70 through the front bezel 130, the 8 cm disc 11 is guided to the disc facing surface 93 and moved in the arrow Y1 direction. Then, the 8 cm disc 11 is in contact with the 8 cm-disc curve wall 94 and held by the 8 cm disc tongue piece 86-8 (the clip disc 74). In addition, the 8 cm disc detecting switch 96 is operated due to the press of the 8 cm disc 11 by means of the 8 cm disc 11 being in contact with the 8 cm-disc curve wall 94. Thereby, the control device 150 can detect that the 8 cm disc 11 is held by the carrier unit 70. Accordingly, a positive determination is made in step 1 (S1), and then the control device 150 begins the control process shown in FIG. 24. In addition, the carrier unit 70 moves in the arrow Y1 direction due to the insertion of the 8 cm disc 11, thereby the switch SW1 is detached from the first protrusion 141a of the upper cam 141. As a result, the switching status of the switches SW1~SW3 becomes [OFF, ON, OFF].

Figure 24:
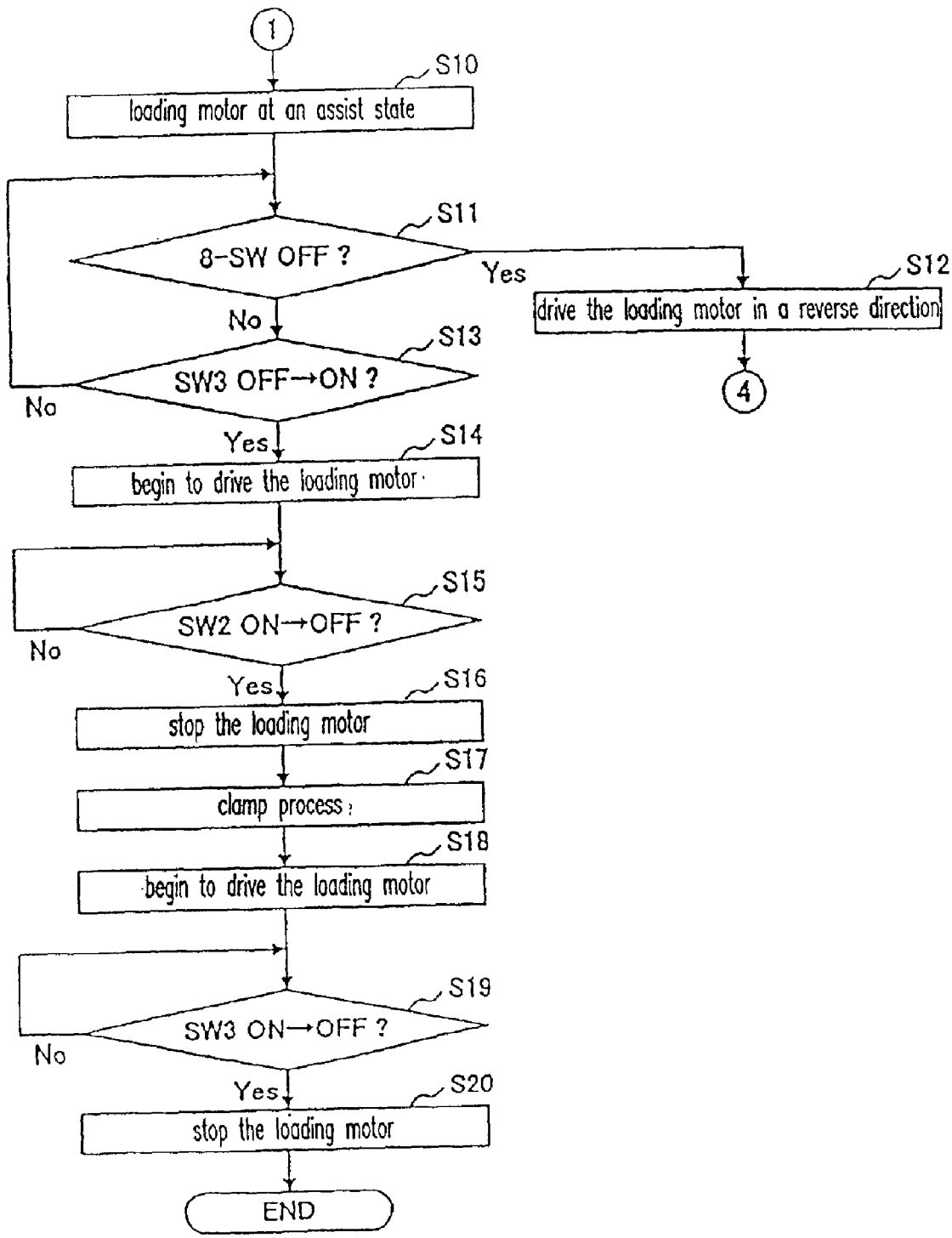
FIG. 24 is a flow chart for explaining the transfer control process executed by the control device (II)

Referring to FIG. 24, the control device 150 begins to apply a voltage to the loading motor 100 in step 10, thereby the gear 102 is rotated through the gear group 101. At this time, during which the carrier unit 70 moves from the position shown in FIG. 2 to a predetermined distance in the arrow Y1 direction, the control device 150 executes a control such that the driving voltage applied to the loading motor 100 is about 20% (0.2×E) of the normal driving voltage (E volts), wherein this control status is referred to a loading motor assist status.

Figure 12:
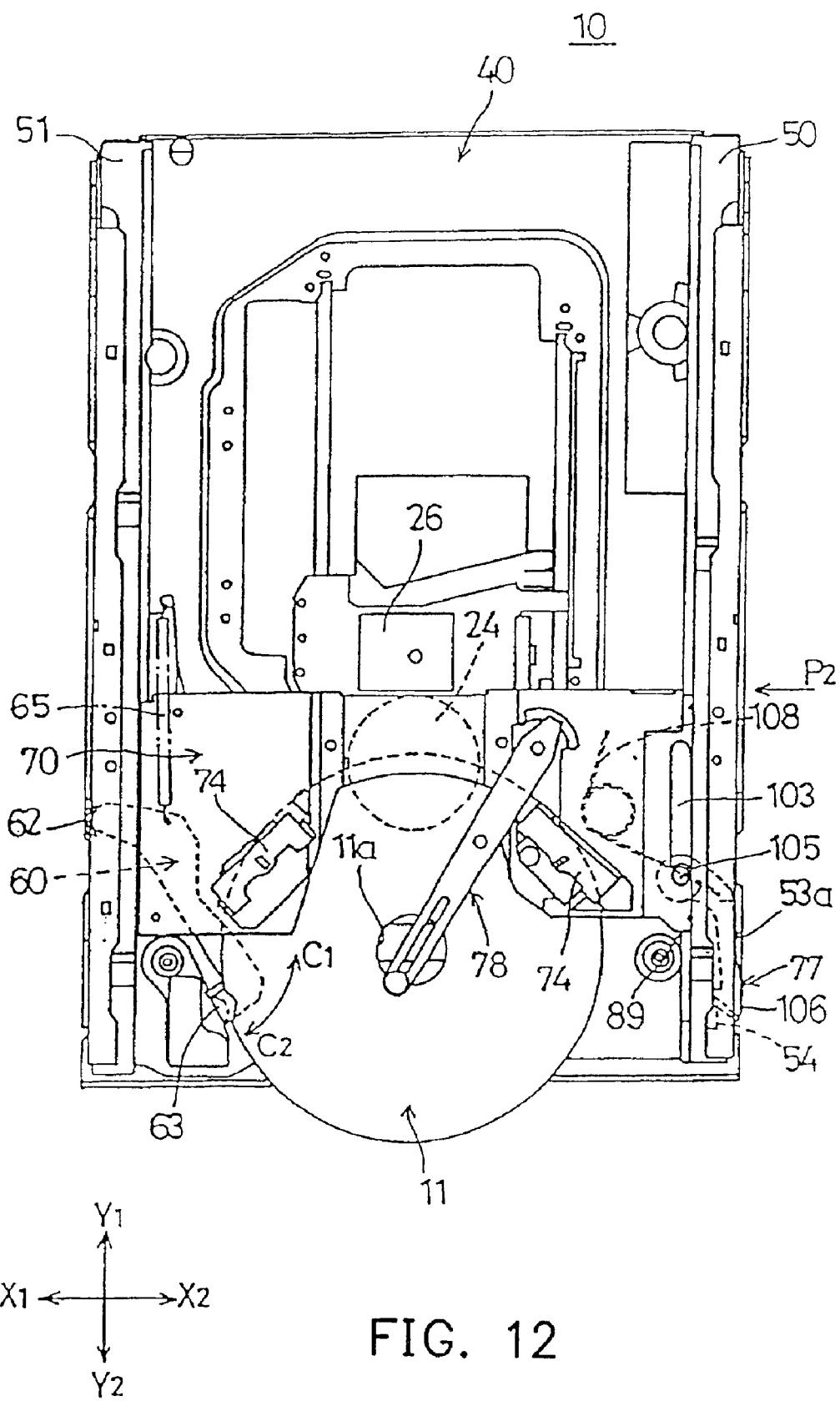
FIG. 12 is a diagram of the 8 cm disc inserted to the loading start position in the disc apparatus installing a recording medium loading apparatus according to one embodiment of the invention.

Concretely, during the time the carrier unit 70 moves from the eject position P1 shown in FIG. 2 to the position shown in FIG. 12, a voltage of about 20% (0.2×E) of the normal driving voltage (E) is applied to the loading motor 100. In addition, the 8 cm disc loading start position (8L start position for short) is referred to as the position of the carrier unit 70 in FIG. 12, which is further indicated by P2 in FIG. 12.

As described above, because the driving force generated by the loading motor 100 decreases when the voltage applied to the loading motor 100 decreases, the carrier unit 70 cannot move under such condition. However, an inserting force, which is applied by an operator for inserting the 8 cm disc 11 to the disc apparatus 10, is applied to the carrier unit 70 when the 8 cm disc 11 is inserted, by which the carrier unit 70 begins to move toward the arrow Y1 direction.

Accordingly, the insertion force of the operator assists the driving force of the loading motor 100 in the operation where the operator inserts the 8 cm disc 11 to the first loading start position P2. Therefore, the 8 cm disc 11 can be inserted using the small insertion force applied by the operator, thereby the operation property can be improved when the 8 cm disc 11 is inserted.

In addition, the control device 150 constantly monitors whether the switch 8-SW96 becomes OFF (step 11, S11) in the loading motor assist status above. Thereafter, the procedure proceeds to step 12 (S12) when a positive determination (namely, the switch 8-SW96 is OFF) in step 11 (S11) is determined, and then the control device 150 drives the carrier unit 70 in a reverse loading direction.

For example, the situation that the positive determination is made in step 11 is that the operator immediately notices after a different disc-shaped recording medium is inserted by mistake, and the 8 cm disc inserted by mistake is withdrawn. According to the embodiment of the invention, in the loading motor assist status executed in step 10, the 8 cm disc 11 can be withdrawn during the transfer because the move of the carrier unit 70 is stopped when the operator releases the insertion force. The operator can exchange the 8 cm disc at the time that the mistaken insertion is noticed without waiting until the 8 cm disc is loaded to the loaded position as the in conventional method, thereby the usability can be improved. In addition, if it determines that the 8 cm disc 11 is withdrawn in step 11, the carrier unit is automatically returned to the eject position P1 by the process in step 12.

Figure 21B:
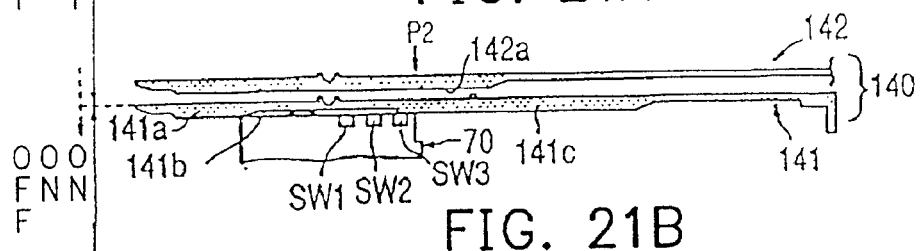

In addition, the control device 150 constantly monitors whether the switch SW3 is switched from OFF to ON in step 13 (S13). Referring to FIG. 21B, the position that the switch SW3 is switched from OFF to ON corresponds to the position that the switch SW3 is engaged with the second protrusion 141c of the upper cam 141.

In the embodiment of the invention, the position that the switch SW3 is engaged with the second protrusion 141c is set to the 8L start position P2, referring to FIG. 21B. Therefore, the steps 11, 13 are repeatedly executed until the positive determination is made in step 13 (S13), or in other words until the carrier unit 70 moves to the 8L start position P2.

Figure 11B:
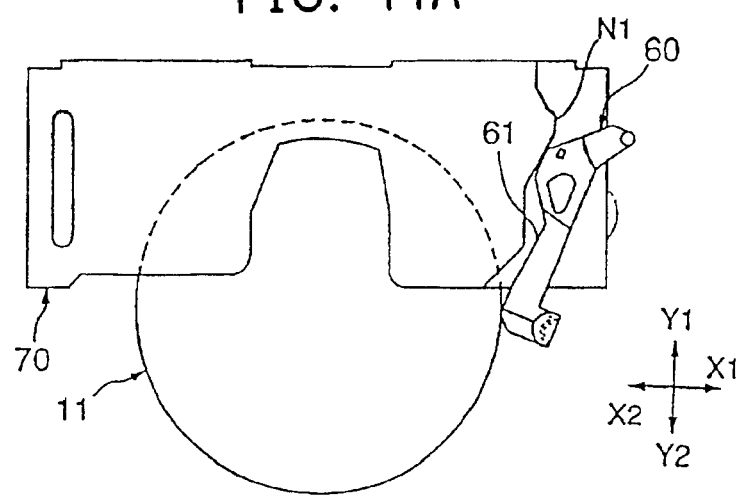
Figure 11C:
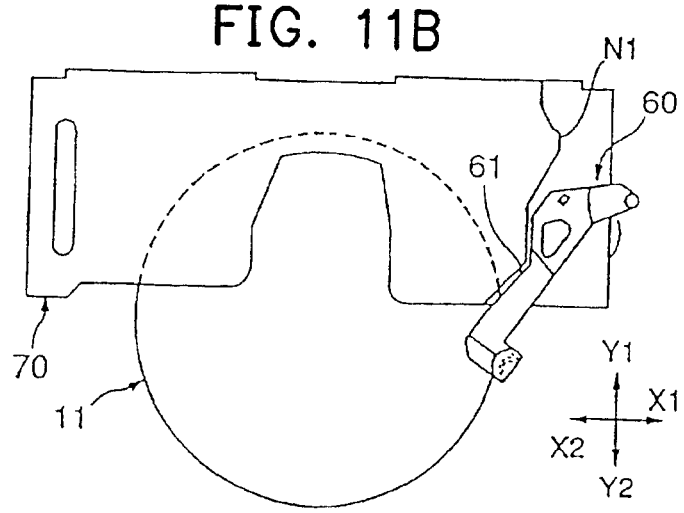

Referring to FIGS. 11A to 11C, the operation of the cartridge lever 60 is described during which the carrier unit 70 moves from the eject position P1 to the 8L start position P2. FIGS. 11A to 11C show the carrier unit 70 and the disc lever 60 viewed from inside, wherein FIG. 11A shows a status wherein the carrier unit 70 is at the eject position P1, FIG. 11B shows a status wherein the carrier unit 70 is between the eject position P1 and the 8L start position P2, and FIG. 11C shows a status wherein the carrier unit 70 is at the 8L start position P2.

The graded cam N1 formed inside the carrier unit 70 moves in the arrow Y1 direction due to the fact that the carrier unit 70 moves from the eject position P1 to the 8L start position P2. Thereby, the disc lever 60 slides in contact with the graded cam N1 formed inside the carrier unit 70 by the actuating force of the disc lever actuating spring 65, and then rotated counterclockwise (the arrow C1 direction in FIG. 12). Then, the engaging jaw 63 formed on the disc lever 60 is engaged with the rear portion in the insertion direction of the 8 cm disc 11, as shown in FIGS. 11C and 12.

The disc lever 60 presses the rear portion of the 8 cm disc 11 in the disc insertion direction by the actuating force of the disc lever actuating spring 65 when the lever body 61 is separated from the graded cam N1.

Accordingly, the front portion in the insertion direction of the 8 cm disc 11 is held by the clip disc 74 and the rear portion in the insertion direction of the 8 cm disc 11 is held by the disc lever 60. In the embodiment of the invention described above, even if the 8 cm disc 11 is not enfolded in a cartridge, the 8 cm disc 11 can be prevented from detaching from the carrier unit 70 and can be stably transferred because both the front and the rear portions in the insertion direction are held.

In addition, the lever body 61 adjusts a rotational operation time by the graded cam N1 formed inside the carrier unit 70. The engaging jaw 63 is in contact with the rear portion in the insertion direction of the 8 cm disc 11 after the maximum diameter portion of the 8 cm disc 11 (the maximum distance portion with respect to the arrow X1, X2 directions, i.e., the center position) passes in the arrow Y1 direction, thereby the disc insertion loading can be reduced.

Now, assuming that the engaging jaw 63 of the disc lever 60 is engaged with the 8 cm disc 11 before passing the maximum diameter portion of 8 cm disc 11, i.e., as the carrier unit 70 begins to move, the 8 cm disc 11 is promptly engaged, the disc lever 60 resists the actuating force of the disc lever actuating spring 65 and has to be rotated counterclockwise (the arrow C2 direction in FIG. 12) with respect to FIG. 11. Therefore, for the configuration that the engaging jaw 63 is engaged with the 8 cm disc 11 before passing the maximum diameter portion of 8 cm disc 11, the required disc insertion loading becomes large for the inserting the 8 cm disc 11.

In regard to the problem above, according to the embodiment of the invention, because the engaging jaw 63 is contact with the 8 cm disc 11 due to the cam N1 immediately after the maximum diameter portion of the 8 cm disc 11 passes in the arrow Y1 direction and the disc lever 60 is rotated only in the actuating direction of the disc lever actuating spring 65 when the 8 cm disc 11 is inserted, the disc insertion loading can be reduced.

On the other hand, the cartridge lever 77 is actuating by the cartridge actuating spring 108 and the axis portion 105 moves in the arrow Y2 direction within the cartridge lever guide grooves 103, 104 due to the fact that the carrier unit 70 moves from the eject position P1 to the 8L start position P2. Namely, the cartridge lever 77 relatively moves in the arrow Y2 direction with respect to the carrier unit 70.

However, the engaging jaw 106 of the cartridge lever 77 is maintained in a status contact status with the cartridge lever retroceding cam 54, and therefore the position of the cartridge lever 77 is not changed with respect to the holder 40.

In addition, the cartridge 77 extends out of the front surface 89 of the carrier unit in the arrow Y2 direction when the carrier unit 70 moves to the 8L start position P2 shown in FIG. 12. However, the cartridge lever 77 does not protrude out of the disc apparatus 10 because the carrier unit 70 moves within the disc apparatus 10.

Figure 13:
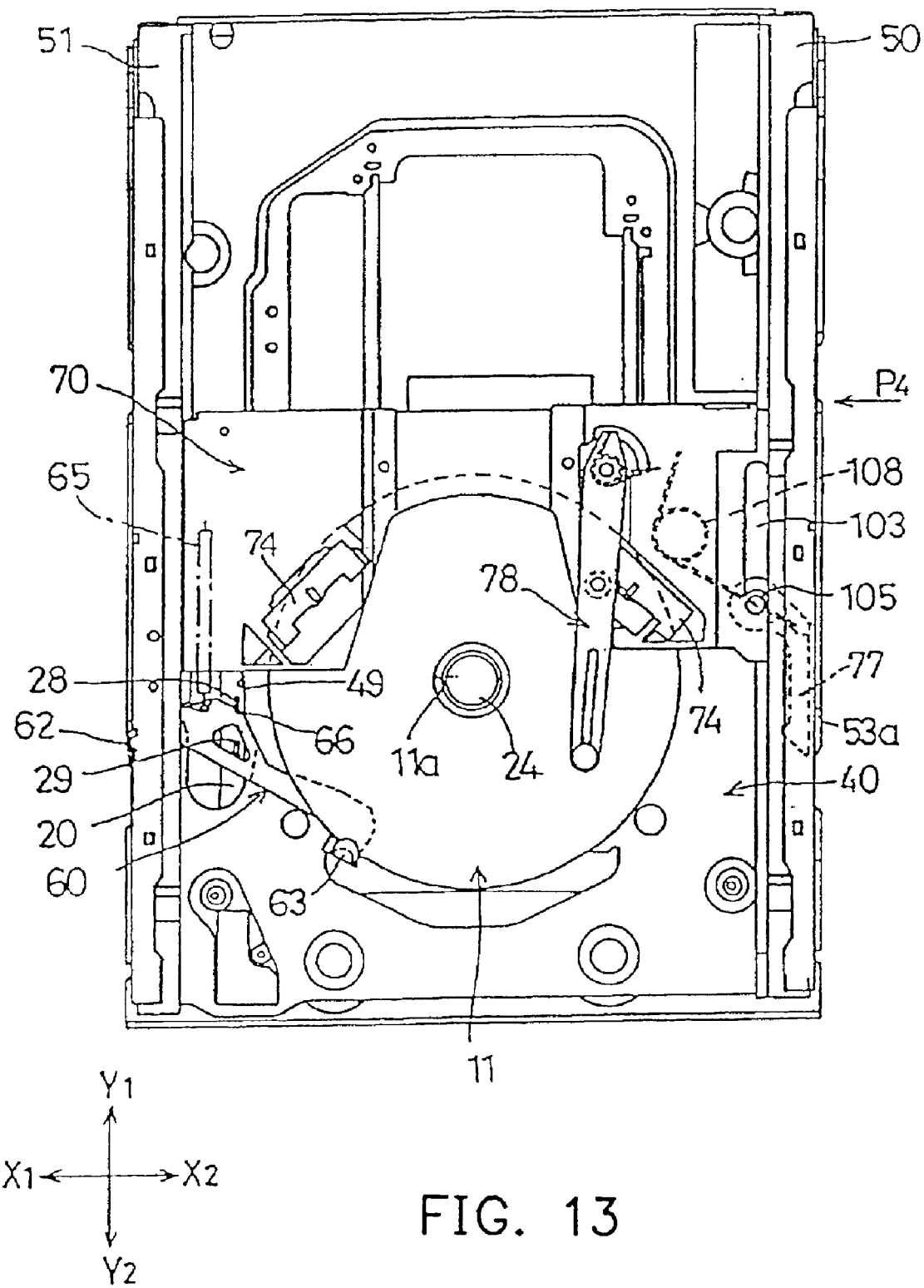
FIG. 13 is a diagram of the 8 cm disc loaded to the loading finish position in the disc apparatus installing a recording medium loading apparatus according to one embodiment of the invention.

On the other hand, when a positive determination is made in step 13 (S13) in FIG. 24, i.e., when it is determined that the carrier unit 70 has moved to the 8L start position P2, the control device 150 applies a normal voltage (E) to the loading motor 100 in step 14 (S14). Therefore, the carrier unit 70 begins to move in the arrow Y1 direction due to the driving force of the loading motor 100. Then, the carrier unit 70 moves to a position where a center hole 11a formed on the center of the 8 cm disc 11 is coincident with the turntable 24 as shown in FIG. 13. Furthermore, in the following description, the position that center hole 11a of the 8 cm disc 11 is coincident with the turntable 24 is referred to as the 8 cm disc loading finish position (8L finish position for short), indicated by P4 in FIG. 13. Additionally, at this time, the position of the 8 cm disc 11 is referred to as the 8 cm disc loaded position.

Figure 21C:
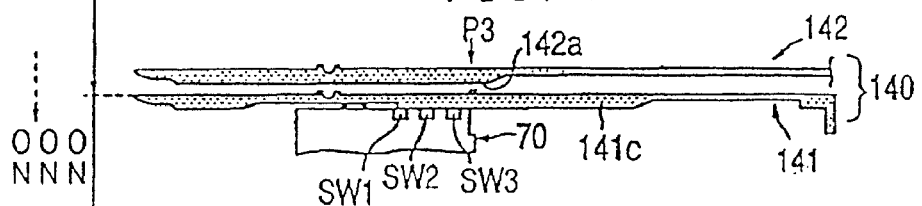
Figure 21D:
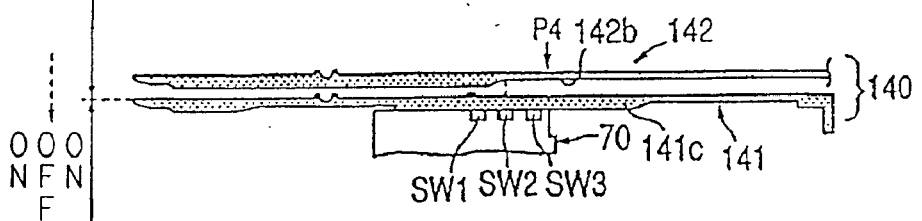

After the process in step 14 (S14) is executed, the control device 150 constantly monitors whether the switch SW2 is switched from ON to OFF in step 15 (S15). Referring to FIG. 21D, the position that the switch SW2 is switched from ON to OFF corresponds to the position where the switch SW2 is detached from the protrusion 142a of the lower cam 142 and opposite to the recess 142b.

In the embodiment of the invention, the position that the switch SW2 is opposite to the recess 142b is set to the 8L finish position P4 (referring to FIG. 21D). Therefore, the carrier unit 70 is continuously moved until the positive determination in step 15 (S15) is made, or until the carrier unit 70 is moved to the 8L finish position P4.

When the carrier unit 70 is moved from the 8L start position P2 to the 8L finish position P4, a status is maintained that the rear portion in the insertion direction of the 8 cm disc 11 is constantly held by the disc lever 60. Namely, the disc lever 60 is freely rotated centered on the rotational axis 62 and constantly actuated in the counterclockwise direction (the direction indicated by the arrow C1 in FIG. 12) by the rotational axis 62. Therefore, the 8 cm disc 11 is transferred in the arrow Y1 direction and then the disc lever 60 is rotated, thereby the disc lever 60 is constantly maintained to engage with the rear portion in the insertion direction of the 8 cm disc 11. Therefore, the 8 cm disc 11 is firmly held by the carrier unit 70 and the disc lever 60 and then stably transferred.

In addition, because the axis portion 105 is restrictively moved to the position in the arrow Y2 direction with in the cartridge lever guide grooves 103, 104 and further due to the fact that the carrier unit 70 is moved in the arrow Y1 direction, the cartridge lever 77 is moved in the arrow Y1 direction together with the carrier unit 70.

At this time, the engaging jaw 106 is detached from the cartridge lever retroceding cam 54, rotated clockwise by the actuating force of the cartridge lever actuating spring 108 and then moved in the arrow Y1 direction. Accordingly, the cartridge lever 77 is rotated clockwise centered on the axis portion 105 along the right rail 50 and the side surface of the cartridge lever 77 is detached from the edge 53a. The cartridge lever 77 is along the right rail 50, extending along the arrow Y1, Y2 directions in FIG. 12.

On the other hand, when the positive determination is made in step 15 (S15), i.e., when the 8 cm disc 11 is transferred to the 8L finish position where the center hole 11a is coincident with the turntable 24, the control device 150 stops the loading motor 100 in step 16 (S16) to stop the move of the carrier unit 70. Then, proceed to step 17 (S17) for executing the clamp process.

Furthermore, before the clamp process, in order to increase the accuracy of the carrier unit stop position, the moving speed of the carrier unit 70 is slowed down and can be moved forward and backward. For example, the loading motor 100 is driven in the reverse direction such that the speed of the carrier unit 70 becomes ½ in response to the switch SW2 switched from ON to OFF in step 15, and then the loading motor 100 is driven in the positive direction such that the speed of the carrier unit 70 becomes ¼ in response to the switch SW2 switched from OFF to ON, and furthermore, the loading motor 100 is stopped in response to the switch SW2 switched from ON to OFF. By performing such an operation above, the accuracy of the carrier unit stop position can be increased.

As for the clamp process in step 17 (S17), the clamping motor 68 is driven to make the holder driving slider 30 move in the arrow X1 direction as shown in FIG. 3. Thereby, the holder 40 is moved centered on the rotational axis 57 from the moving-up position shown in FIG. 4A to the moving-down position shown in FIG. 4B, and then the 8 cm disc 11 is moved down and held by the turntable 24. Additionally, as described above, the damper 58 assembled on the holder 40 is absorbed by the turntable 24 due to the absorption force of the clamp magnet, and therefore the 8 cm disc 11 is clamped between the damper 58 and the turntable 24.

The 8 cm disc 11 becomes rotatable by the disc motor 25. However, the 8 cm disc 11 cannot be rotated in the status held by the disc lever 60. Therefore, the disc lever 60 is retroceded from the position holding the 8 cm disc 11 in the clamp process. The operation retroceding from the position where the disc lever 60 holds the 8 cm disc 11 is described in detail as follows.

As described above, the first and the second disc lever driving cams 28, 29 are installed on the base 20 in a standing manner. The first disc lever driving cam 28 is installed to a position corresponding to the position of the disc lever 60 when the carrier unit 70 moves to the 8L finish position P4.

The disc lever 60 is rotated centered on the rotational axis 62 when the carrier unit 70 moves in the arrow Y1 direction and the 8 cm disc 11 is transferred in the same direction. Then, the engaging portion 66 of the disc lever 60 is opposite to the first disc lever driving cam 28 when the 8 cm disc 11 is moved to the 8L finish position P4 in FIG. 13 and then the disc lever 60 is rotated to the position as shown in FIG. 13.

Figure 14:
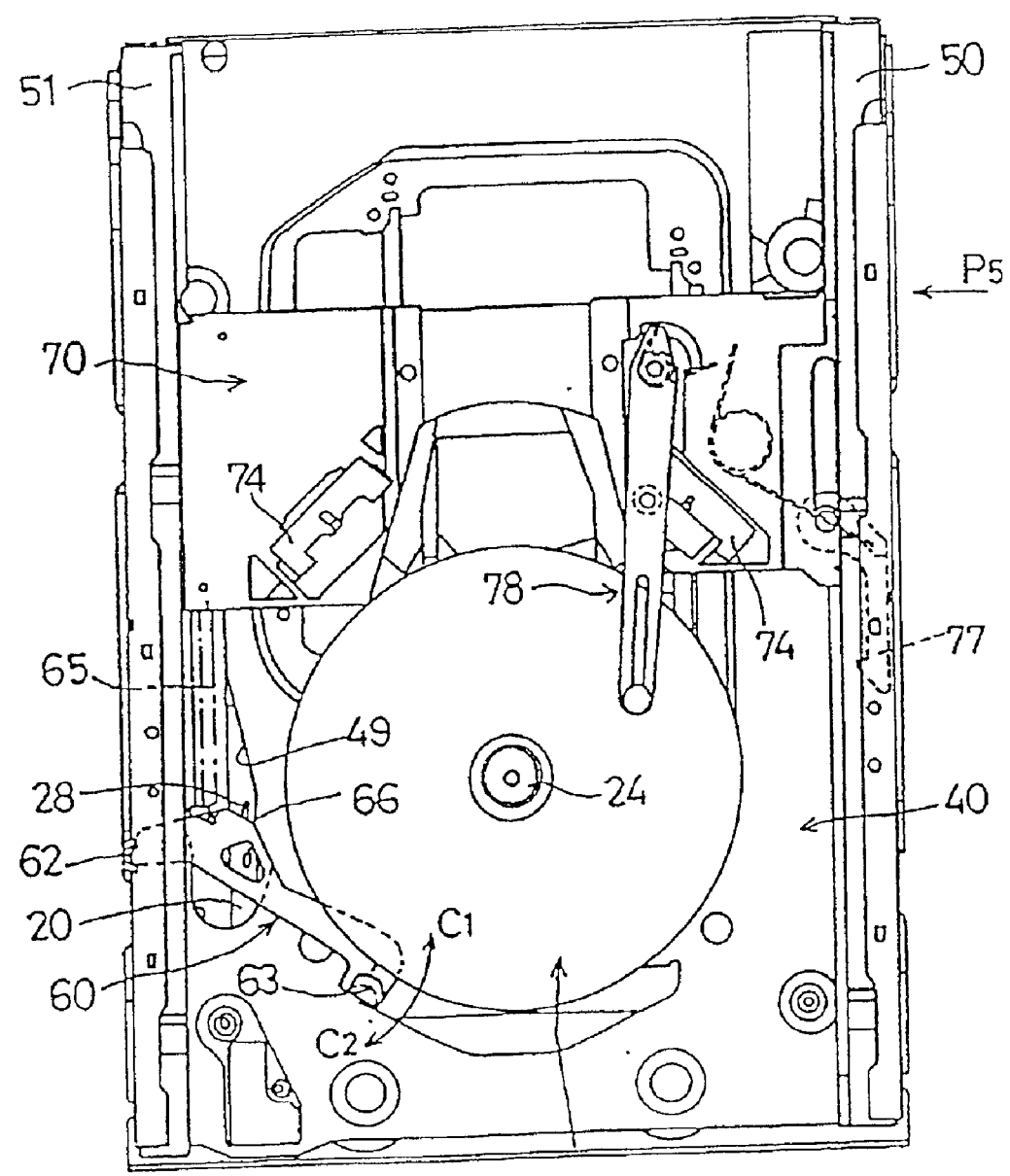
FIG. 14 is a diagram of the disc apparatus installing a recording medium loading apparatus executing the reproducing/recording process to the 8 cm disc according to one embodiment of the invention.

Accordingly, due to the fact that the holder 40 is moved from the moving-up position to the moving-down position, the first disc lever driving cam 28 is engaged with the engaging portion 66 of the disc lever 60 and then the disc lever 60 is rotated in the arrow C2 direction shown in FIG. 14. As a result, the engaging jaw 63 installed on the disc lever 60 is detached from the 8 cm disc 11, as shown in FIG. 14.

At this time, as shown in FIG. 4A, the rotation of the disc lever 60 can be smoothly rotated because a tilt surface is formed on the first disc lever driving cam 28. Additionally, according to the embodiment, in order to cause the disc lever 60 to detach from the 8 cm disc 11, the move of the holder 40 is used as a driving source to rotate the disc lever 60 without using any additional driving device such as a solenoid etc. Therefore, the disc lever 60 can be exactly detached from the 8 cm disc 11 by a simple structure.

However, the 8 cm disc 11 is maintained held by the carrier unit 70 at the time point that the process in step 17 (S17) is finished. Therefore, even if the disc lever 60 is detached from the 8 cm disc 11, the 8 cm disc still cannot be rotated.

As described above, when the carrier unit 70 is transferred to the 8L finish position P4, the 8 cm disc 11 is clamped between the damper 58 and the turntable 24. Namely, in such a situation, it is impossible that the 8 cm disc 11 can be moved in the arrow Y1, Y2 directions.

The control device 150 executes step 18 in FIG. 24 whether the 8 cm disc 11 is clamped is detected by a detecting switch (not shown), and in which the loading motor 100 is driven to cause the carrier unit 70 to move to the position shown in FIG. 14. Furthermore, in the following description, the position of the carrier unit 70 shown in FIG. 14 is referred to as the 8 cm disc retrocede position (8L retrocede position for short), indicated by P5 in the drawing.

The control device 150 determines whether the switch SW 3 is switched from ON to OFF in step 19 (S19) in order to cause the carrier unit 70 stop at the 8L retrocede position P5. Referring to FIG. 21, the position wherein the switch SW3 is switched from ON to OFF corresponds to the position that the switch SW3 is detached from the second protrusion 141c of the upper cam 141 and then is opposite to the second recess 141d.

Figure 21E:
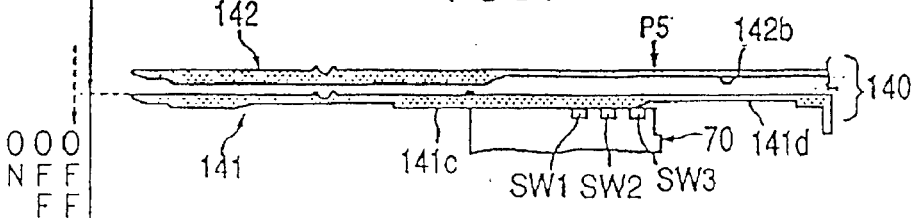

Referring to FIG. 21E, the position that the switch SW3 is opposite to the second recess 141d is set to the 8L retrocede position P5 according to the embodiment of the invention. Then, when the positive determination is made in step 19 (S19), the control device 150 executes the process in step 20 to stop the loading motor 100, by which the carrier unit 70 is stopped at the 8L retrocede position P5.

As described above, at the status wherein the 8 cm disc 11 is clamped, by means of the carrier unit 70 being moved from the 8L finish position to the 8L retrocede position, each clip disc 74 is detached from the 8 cm disc 11. As a result, the 8 cm disc 11 held by the carrier unit 70 is also released, and then the reproducing or recording process can be performed to the 8 cm disc 11.

Moreover, when the 8 cm disc 11 is ejected from the disc apparatus 10, the operation is reverse to the loading operation described above, which detailed description is omitted. The normal voltage (E) is also applied to the loading motor from the 8L start position P2 shown in FIG. 12 to the eject position P1 shown in FIG. 2 when the 8 cm disc 11 is ejected. Therefore, the operation that the operator takes the 8 cm disc 11 out of the carrier unit 70 is in a status wherein the carrier unit 70 is at the eject position shown in FIG. 2. The taking-out operation of the 8 cm disc 11 can be easily processed because the 8 cm disc 11 is greatly drawn out of the front bezel 130 in such a status.

Next, the control operation executed by the control device 150 when the positive determination is made in the step 2 shown in FIG. 23 will be described in detail below. In the eject status shown in FIG. 2 (namely, the carrier unit 70 is at the eject position P1), when the 12 cm disc 12 is inserted to the disc apparatus 10 through the front bezel 130, the 12 cm disc 12 is guided to the disc facing surface 93 and moved in the arrow Y1 direction to be in contact with the 12 cm-disc curve wall 95, and then held by the 12 cm disc tongue piece 86-12 (clip disc 74).

In addition, the 12 cm disc detecting switch 97 is pressed by the 12 cm disc 12 because the 12 cm disc 12 is contact with the 12 cm-disc curve wall 95. Therefore, as the positive determination is made in step 2, the control device 150 starts the procedure in FIG. 25.

Figure 15:
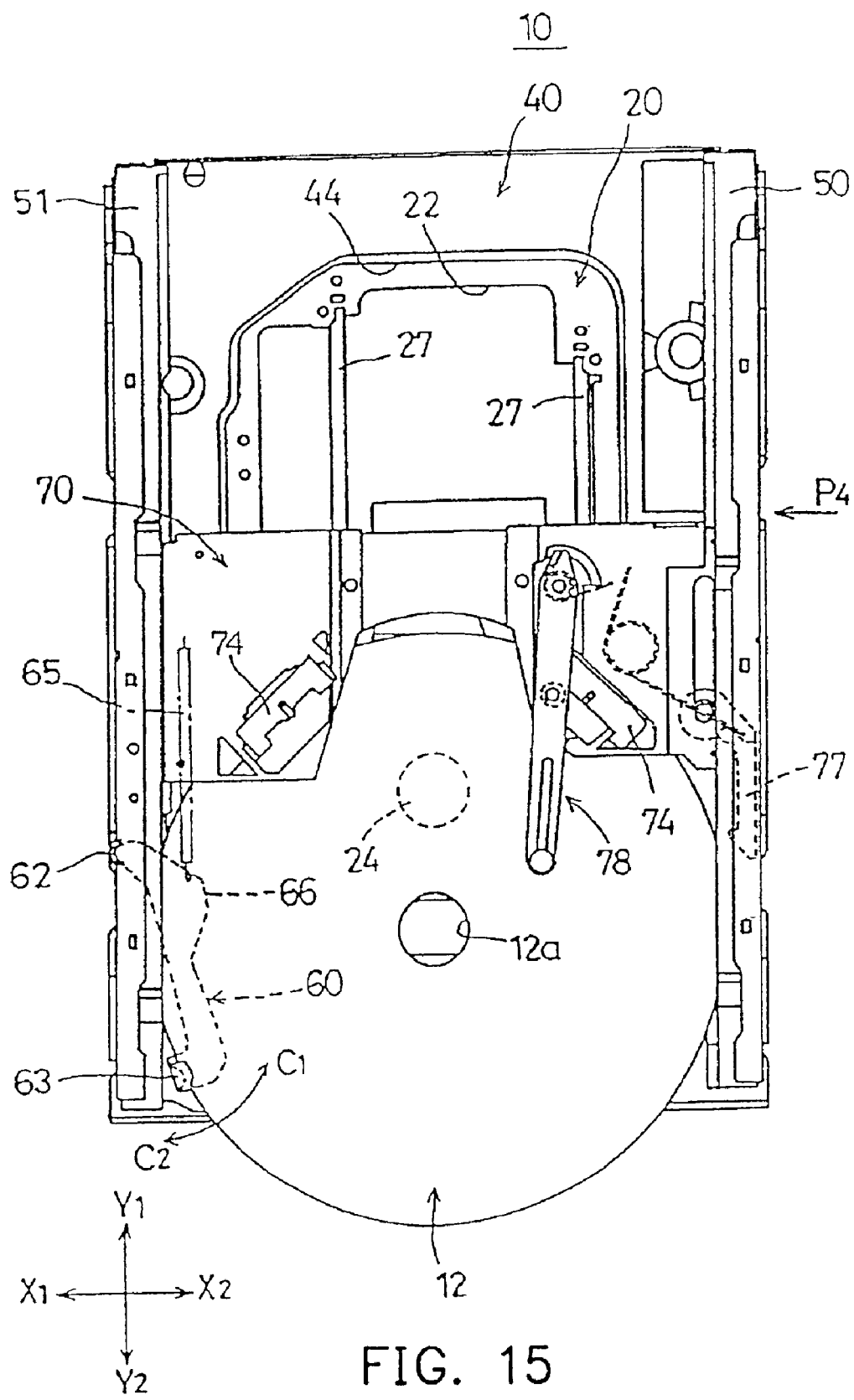
FIG. 15 is a diagram of the 12 cm disc inserted to the loading start position in the disc apparatus installing a recording medium loading apparatus according to one embodiment of the invention.
Figure 25:
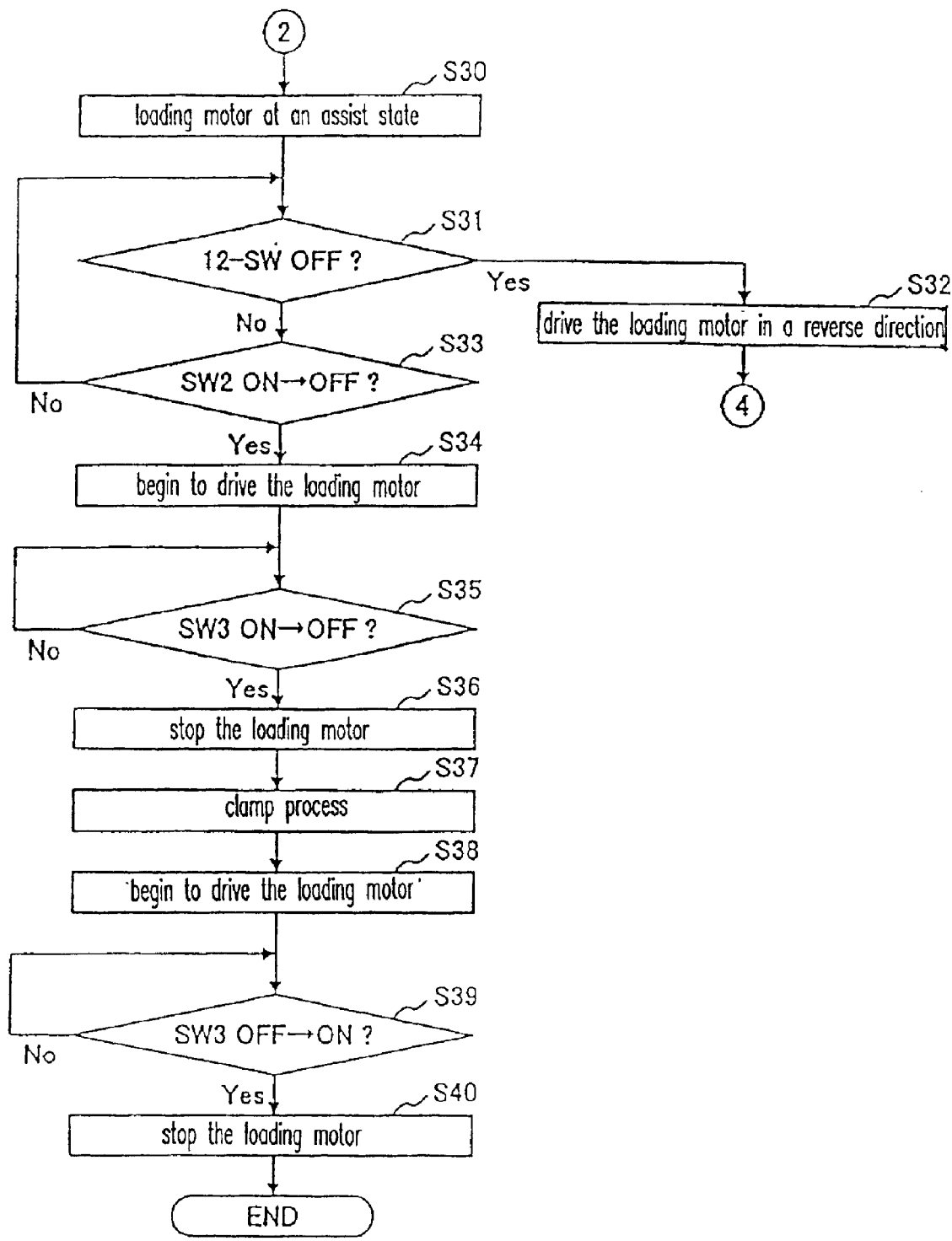
FIG. 25 is a flow chart for explaining the transfer control process executed by the control device (III)

When the procedure in FIG. 25 starts, the control device 150 causes the loading motor 100 to be at the loading motor assist status. Namely, the control device 150 also applies a voltage about 20% (0.2×E) of the normal driving voltage (E) to the loading motor 100 while the carrier unit 70 is moved from the position in FIG. 2 to the position in FIG. 15 when the 12 cm disc 12 is inserted, by which the operational property during disc insertion can be improved. In the following description, the position of the carrier unit 70 shown in FIG. 15 is referred to the 12 cm disc loading start position (12L start position for short), indicating by P4 in the drawing. Additionally, the 12L start position P4 is set to the same position as the 8L finish position P4 in FIG. 13 when the 8 cm disc 11 is transferred.

The control device 150 monitors the output of the switch 12-SW97 in step 31 (S31) when the carrier unit 70 is moved from the eject position P1 to the 12L start position P4. In the case wherein the switch 12-SW97 becomes OFF, the control device 150 determines that the 12 cm disc 12 is taken out by the operator, and then executes a return process such that the carrier unit 70 returns to the eject position P1.

Therefore, even if the operator notices a wrong insertion when the 12 cm disc 12 is inserted, the 12 cm disc can be immediately changed as soon as the mistaken insertion is noticed, and therefore the usability can be improved. In addition, by the process in step 32, because the carrier unit 70 is automatically returned to the eject position P1 as the disc is drawn, a new 8 cm disc 11, 12 cm disc 12 or disc cartridge 13 can be rapidly changed to insert to the disc apparatus.

On the other hand, the graded cam N1 is moved in the arrow Y1 direction because the carrier unit 70 is moved from the eject position P1 to the 12L start position P4. Therefore, the lever body 61 of the disc lever 60 slides in contact with the graded cam N1 by the actuating force of the disc lever actuating spring 65 and then is rotated counterclockwise (the arrow C1 direction in FIG. 15). Then, the engaging jaw 63 formed on the disc lever 60 is engaged with the rear portion in the insertion direction of the 12 cm disc 12 as shown in FIG. 15. After the lever body 61 detaches from the graded cam N1, the disc lever 60 uses the actuating force of the disc lever actuating spring 65 to press the 12 cm disc 12.

The 12 cm disc 12 is firmly held because the front portion in the insertion direction is held by the clip disc 74 and the rear portion in the insertion direction is held by the disc lever 60. Because both the front and the rear portions in the insertion direction are held, even if the 12 cm disc 12 is not enfolded by a cartridge, the 12 cm disc 12 can be prevented from detaching from the carrier unit 70 and can be stably transferred.

On the other hand, the cartridge lever 77 is actuated by the cartridge lever actuating spring 108 and by means of the carrier unit 70 being moved from the eject position P1 to the 12L start position P4, and then the axis portion 105 is moved in the arrow Y2 direction within the cartridge lever guide grooves 103, 104. The cartridge lever 77 is relatively moved in the arrow Y2 direction with respect to the carrier unit 70. Additionally, the 12L start position P4 when the 12 cm disc 12 is inserted is set to a position separated by a predetermined distance from the 8L start position P2 when the 8 cm disc 11 is inserted in previous description.

Accompanying the move toward the 12L start position P4 of the carrier unit 70, the engaging jaw 106 of the cartridge lever 77 is detached from the cartridge lever retroceding cam 54 and rotated clockwise by the actuating force of the cartridge lever actuating spring 108 to move in the arrow Y1 direction. Thereby, the cartridge lever 77 is rotated clockwise centered on the axis portion 105 along the right rail 50. As shown in FIG. 15, the cartridge lever 77 is arranged along the right rail 50, extending in the arrow Y1, Y2 directions.

Referring to FIG. 25 again for describing the control operation of the control device 150, the control device 150 constantly monitors whether the switch SW2 is switched from ON to OFF in step 33 (S33). Referring to FIG. 21D, the position wherein the switch SW2 is switched from ON to OFF is the position wherein the switch SW2 is detached from protrusion 142a of the lower cam 142 and opposite to the recess 142b.

In the embodiment of the invention, the position wherein the switch SW2 is opposite to the recess 142b is set to the 12L start position P4, as shown in FIG. 21D. Accordingly, the processes in steps 31, 31 are repeatedly executed until the positive determination in step 33 is made, i.e., until the carrier unit 70 is moved to the 12L start position P4.

Figure 16:
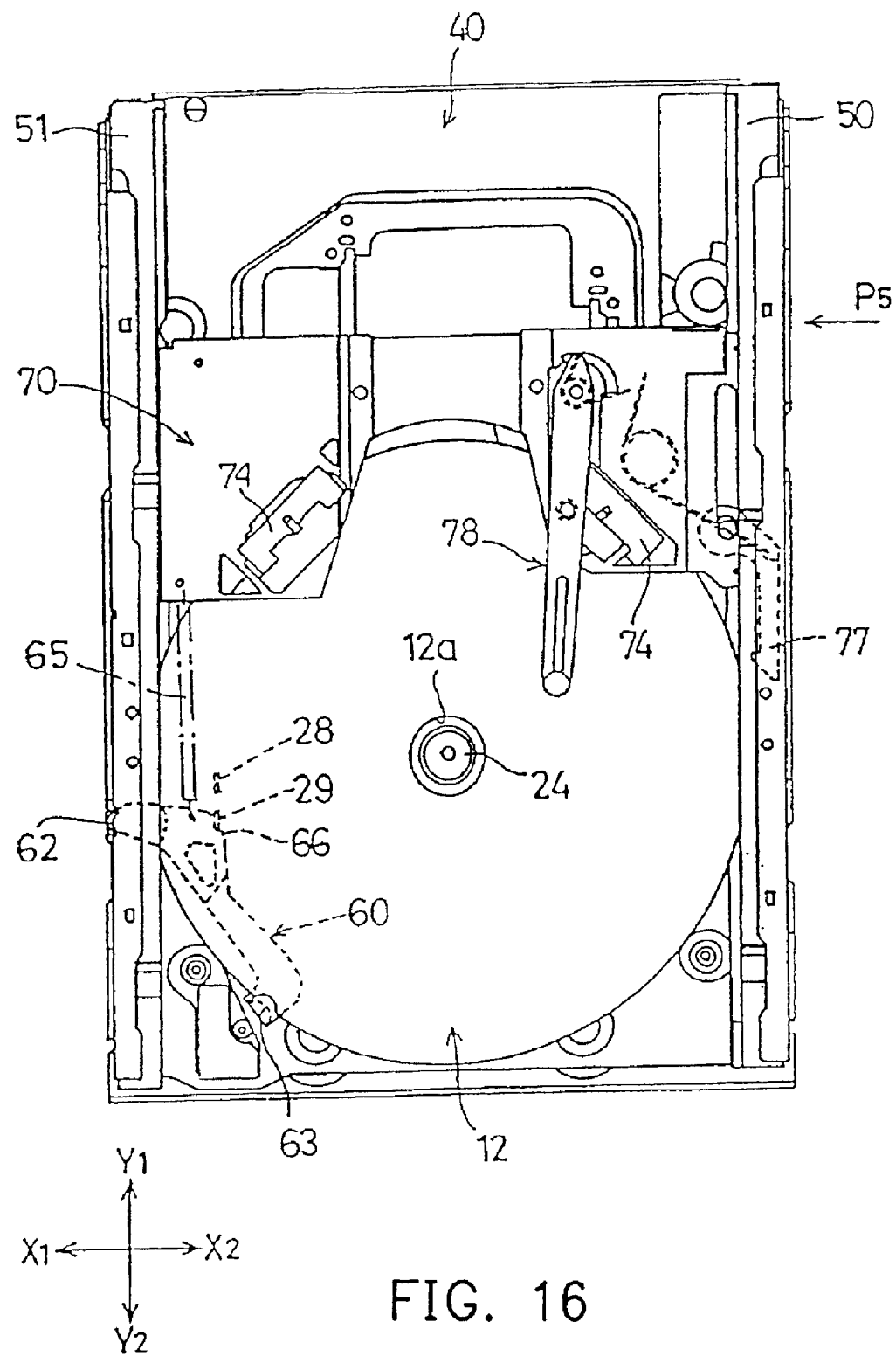
FIG. 16 is a diagram of the 12 cm disc loaded to the loading finish position in the disc apparatus installing a recording medium loading apparatus according to one embodiment of the invention.

On the other hand, when a positive determination is made in step 33 (S33) in FIG. 25, i.e., when the carrier unit 70 is moved to the 12L start position P4 is determined, the control device 150 applies a normal voltage (E) to the loading motor 100 in step 34 (S34). Therefore, the carrier unit 70 begins to move in the arrow Y1 direction due to the driving force of the loading motor 100. Then, the carrier unit 70 moves to a position that a center hole 12a formed on the center of the 12 cm disc 12 is coincident with the turntable 24 as shown in FIG. 16. Furthermore, in the following description, the position that center hole 12a of the 12 cm disc 12 is coincident with the turntable 24 is referred to as the 12 cm disc loading finish position (12L finish position for short), indicating by P5 in FIG. 16. Additionally, the 12L finish position P5 is set to the same position of the 8L retroceding position P5 in FIG. 14 when the 8 cm disc 11 is transferred. Furthermore, the position of the 12 cm disc 12 when the carrier unit 70 is at the 12L finish position P5 is referred to the 12 cm disc loaded position.

After the process in step 34 (S34) is executed, the control device 150 constantly monitors whether the switch SW3 is switched from ON to OFF in step 35 (S35). Referring to FIG. 21E, the position that the switch SW3 is switched from ON to OFF corresponds to a position that the switch SW3 is detached from the second protrusion 141c of the upper cam 141 and opposite to the second recess 142d.

In the embodiment of the invention, the position wherein the switch SW3 is opposite to the second recess 141d is set to the 12L finish position P5 (referring to FIG. 21E). Therefore, the carrier unit 70 is continuously moved until the positive determination in step 35 (S35) is made, i.e., until the carrier unit 70 is moved to the 12L finish position P5.

When the carrier unit 70 is moved from the 12L start position P4 to the 12L finish position P5, which is similar to the 8 cm disc transfer, a status is maintained that the rear portion in the insertion direction of the 8 cm disc 11 is constantly engaged with the disc lever 60. Therefore, the 12 cm disc 12 is firmly held by the carrier unit 70 and the disc lever 60 and then stably transferred when the disc 12 is transferred between the 12L start position P4 and the 12L finish position P5.

In addition, according to the embodiment of the invention, because the disc lever 60 is rotatably installed on the holder 40, the rear portion in the insertion direction of the 8 cm disc 11 and the 12 cm disc 12, though having different diameters, can be held by one disc lever 60. Therefore, the part number of the disc apparatus 10 can be reduced and the structure is simplified.

On the other hand, when the positive determination is made in step 35 (S35), i.e., when the 12 cm disc 12 is transferred to the 12L finish position so that the center hole 12a is coincident with the turntable 24, the control device 150 stops the loading motor 100 in step 36 (S36) to stop the move of the carrier unit 70. Then, proceed to step 37 (S37) for executing the clamp process. The process of the step 37 is the same clamp process of the step 17 in FIG. 24.

The clamping motor 68 is driven to make the holder driving slider 30 move in the arrow X1 direction as shown in FIG. 3. Thereby, the holder 40 is moved centered on the rotational axis 57 from the moving-up position shown in FIG. 4A to the moving-down position shown in FIG. 4B, and then the 12 cm disc 12 is moved down and held by the turntable 24, and additionally clamped between the damper 58 and the turntable 24.

The 12 cm disc 12 becomes rotatable by the disc motor 25. However, the 12 cm disc 12 cannot be rotated in the status held by the disc lever 60. Therefore, the disc lever 60 is retroceded from the position holding the 12 cm disc 12 in the clamp process. The operation retroceding from the position that the disc lever 60 holds the 12 cm disc 12 is described in detail as follows.

As described above, the first and the second disc lever driving cams 28, 29 are installed on the base 20 in a standing manner. The second disc lever driving cam 29 is installed to a position corresponding to the position of the disc lever 60 when the carrier unit 70 moves to the 12L finish position P5.

Namely, the disc lever 60 is rotated centered on the rotational axis 62 when the carrier unit 70 moves in the arrow Y1 direction and the 12 cm disc 12 transferred in the same direction. Then, the engaging portion 66 of the disc lever 60 is opposite to the second disc lever driving cam 29 when the 12 cm disc 12 is moved to the 12L finish position P5 in FIG. 16 and then the disc lever 60 is rotated to the position as shown in FIG. 16.

Figure 17:
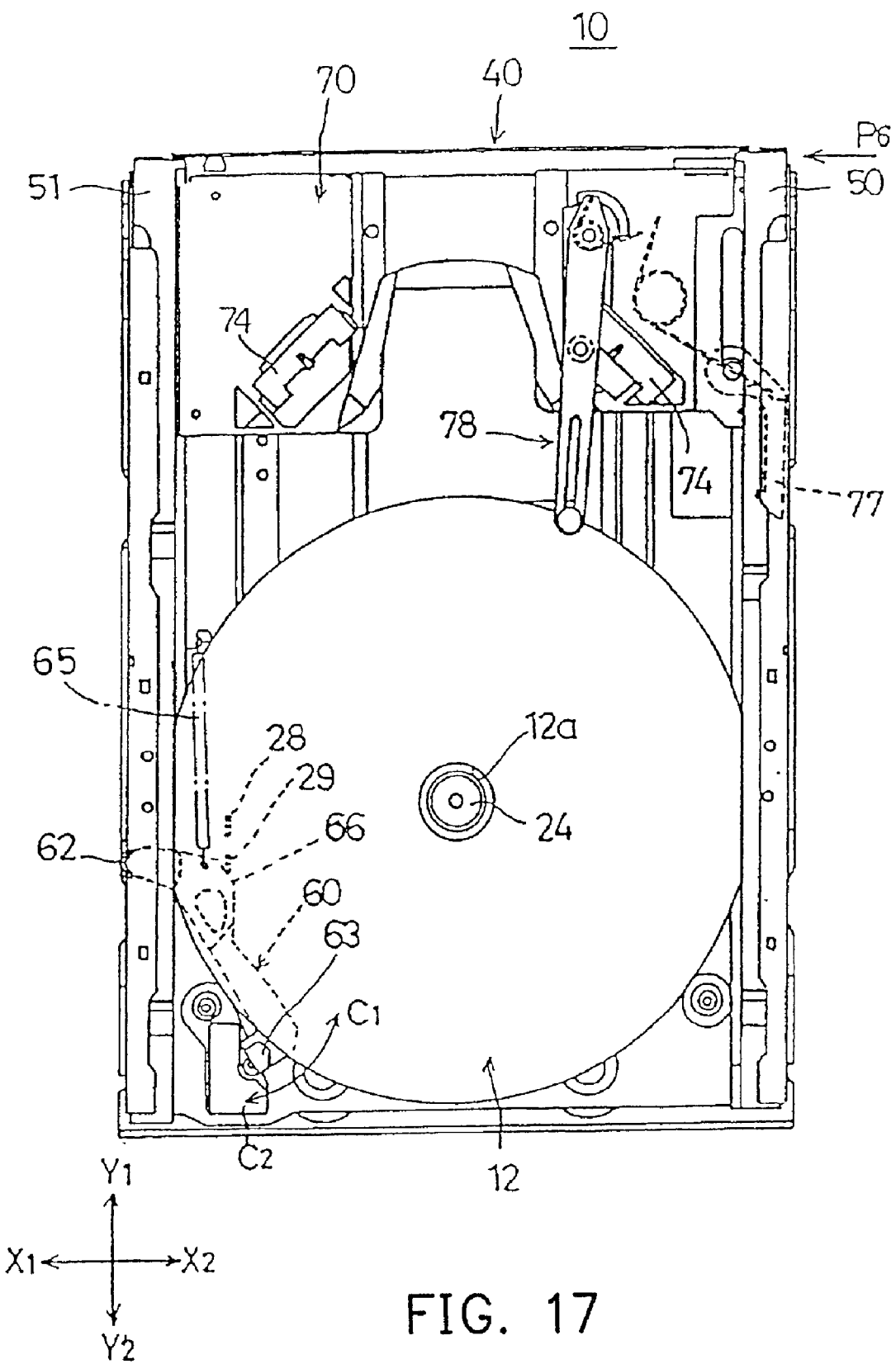
FIG. 17 is a diagram of the disc apparatus installing a recording medium loading apparatus executing the reproducing/recording process to the 12 cm disc according to one embodiment of the invention.

Accordingly, due to the fact that the holder 40 is moved from the moving-up position to the moving-down position, the second disc lever driving cam 29 is engaged with the engaging portion 66 of the disc lever 60 and then the disc lever 60 is rotated in the arrow C2 direction shown in FIG. 17. As a result, the engaging jaw 63 installed on the disc lever 60 is detached from the 12 cm disc 12, as shown in FIG. 17.

At this time, the actuating rotation of the disc lever 60 can smoothly rotate because a tilt surface is formed on the second disc lever driving cam 29. Additionally, according to the embodiment, in order to cause the disc lever 60 to detach from the 12 cm disc 12, the move of the holder 40 is used as a driving source to rotate the disc lever 60 without using any additional driving device. Therefore, the structure of the disc apparatus 10 can be simplified.

However, the 12 cm disc 12 is maintained held by the carrier unit 70 at the time point that the process in step 37 (S37) is finished. Therefore, even if the disc lever 60 is detached from the 12 cm disc 12, the 12 cm disc still cannot be rotated.

As described above, when the carrier unit 70 is transferred to the 12L finish position P5, the 12 cm disc 12 is clamped between the damper 58 and the turntable 24. In such a situation, it is impossible for the 12 cm disc 12 to be moved in the arrow Y1, Y2 directions.

The control device 150 executes the step 38 in FIG. 25, when whether the 12 cm disc 12 is clamped is detected by a detecting switch (not shown), by which the loading motor 100 is driven to cause the carrier unit 70 to move to the position shown in FIG. 17. Furthermore, in the following description, the position of the carrier unit 70 shown in FIG. 17 is referred to as the 12 cm disc retrocede position (12L retrocede position for short), indicated by P6 in the drawing.

Figure 21F:
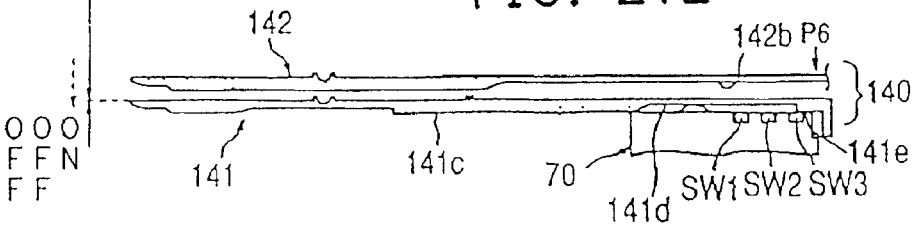

The control device 150 determines whether the switch SW 3 is switched from OFF to ON in step 39 (S39) in order to cause the carrier unit 70 to stop at the 12L retrocede position P6. Referring to FIG. 21F, the position wherein the switch SW3 is switched from OFF to ON corresponds to the position wherein the switch SW3 is detached from the second recess 141d of the upper cam 141 and then opposite to the third recess 141e.

In the embodiment, the position wherein the switch SW3 is engaged with the third recess 141e is set to the 12L retrocede position P6. Then, when the positive determination is made in step 39 (S39), the control device 150 executes the process in step 40 to stop the loading motor 100, by which the carrier unit 70 is stopped at the 12L retrocede position P6.

As described above, at the status wherein the 12 cm disc 12 is clamped, by means of the carrier unit 70 being moved from the 12L finish position P5 to the 12L retrocede position P6, each clip disc 74 is detached from the 12 cm disc 12. As a result, the 12 cm disc 12 held by the carrier unit 70 is also released, and then the reproducing or recording process can be performed to the 12 cm disc 12.

Moreover, when the 12 cm disc 12 is ejected from the disc apparatus 10, the operation is reverse to the loading operation described above, which detailed description is omitted. But, the normal voltage (E) is also applied to the loading motor from the 12L start position P4 shown in FIG. 12 to the eject position P1 shown in FIG. 2 when the 12 cm disc 12 is ejected. Therefore, the operation wherein the operator takes the 12 cm disc 12 out of the carrier unit 70 is in a status wherein the carrier unit 70 is at the eject position shown in FIG. 2. The taking-out operation of the 12 cm disc 12 can be easily processed because the 12 cm disc 12 is greatly drawn out of the front bezel 130 in such a status.

Next, the control operation executed by the control device 150 when the positive determination is made in step 3 shown in FIG. 23 will be described in detail below.

In the eject status of the disc apparatus in FIG. 2, the front end of the disc cartridge 13 first contacts with the front surface 89 of the carrier unit 70 when the disc cartridge 13 is inserted through the front bezel 130. Because the disc cartridge detecting switch 98 is installed on the front surface 89 (referring to FIG. 10), the disc cartridge detecting switch 98 is pressed by means of the disc cartridge 13's contact with the front surface 89 of the carrier unit 70. Thereby, if the positive determination is made in step 3, the control device 150 starts the process shown in FIG. 26. In addition, in the status wherein the disc cartridge 13 is in contact with the carrier unit 70, the shutter driving pin 113 installed on the shutter lever 78 is engaged with the end of the shutter 15 installed on the disc cartridge 13.

Figure 26:
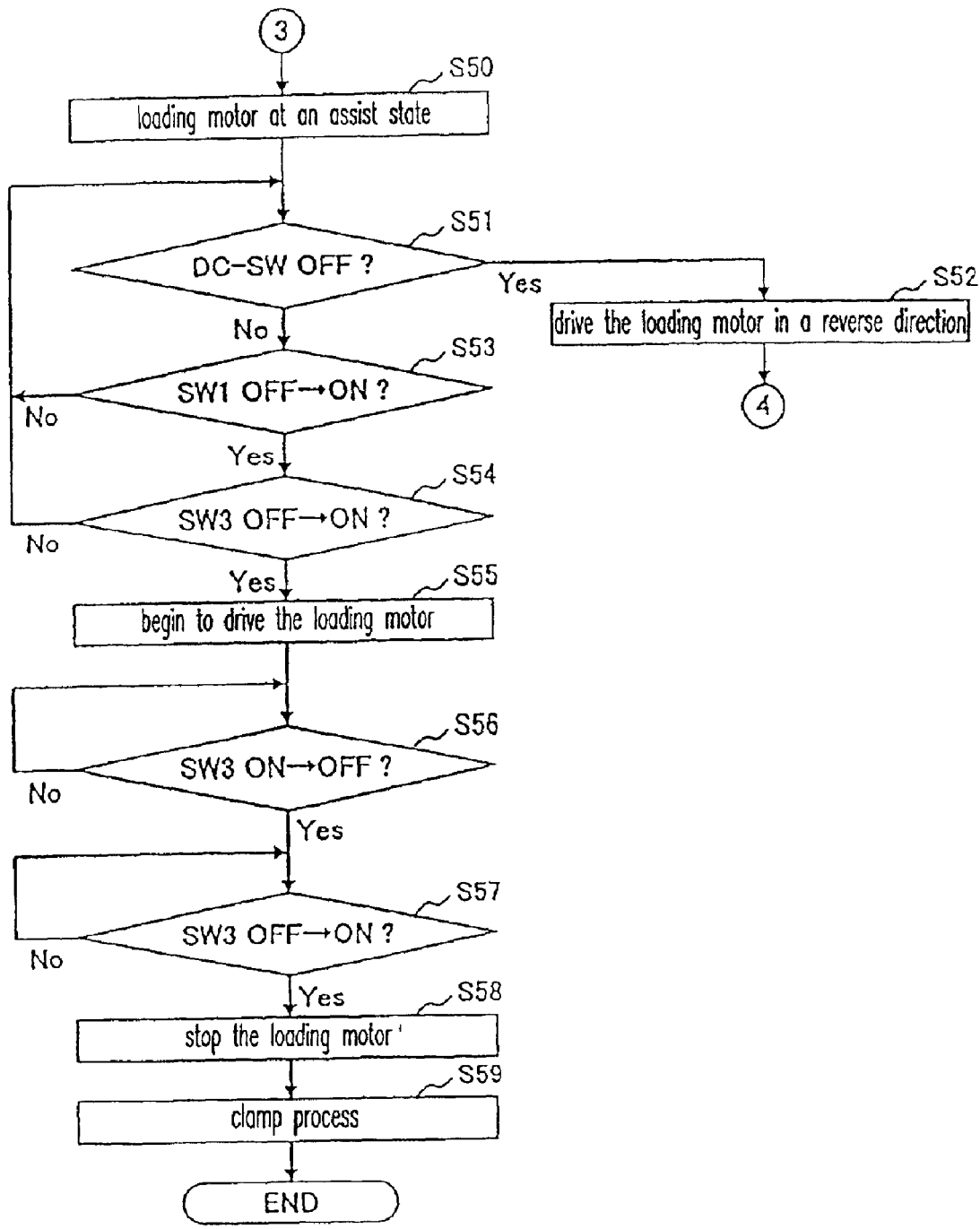
FIG. 26 is a flow chart for explaining the transfer control process executed by the control device (IV).

When the procedure in FIG. 26 starts, the control device 150 causes the loading motor 100 to be at the loading motor assist status in step 50. Namely, the control device 150 also applies a voltage about 20% (0.2×E) of the normal driving voltage (E) to the loading motor 100 during which the carrier unit 70 is moved from the position in FIG. 2 to the position in FIG. 18 when the disc cartridge 13 is inserted, by which the operational property during disc insertion can be improved. In the following description, the position of the carrier unit 70 shown in FIG. 18 is referred to as the disc cartridge loading start position (DL start position for short), indicated by P3 in the drawing.

The control device 150 monitors the output of the switch DC-SW98 in step 51 (S51) when the carrier unit 70 is moved from the eject position P1 to the DL start position P3. In the case that the switch DL-SW98 becomes OFF in step 51, the control device 150 determines that the disc cartridge 13 is drawn by the operator, and then executes a return process such that the carrier unit 70 returns to the eject position P1 in step 52.

Therefore, even if the operator notices a wrong insertion when the disc cartridge 13 is inserted, the disc cartridge can be immediately changed as soon as the mistake insertion is noticed, and therefore the usability can be improved. In addition, by the process in step 52, because the carrier unit 70 is automatically returned to the eject position P1 as the disc cartridge is drawn, a new 8 cm disc 11, 12 cm disc 12 or disc cartridge 13 can be rapidly changed to insert to the disc apparatus 10.

Therefore, the disc lever 60 is retroceded to a position preventing the insertion of the disc cartridge from disturbance when the carrier unit 70 is moved from the eject position P1 to the DL start position P3. Namely, the disc lever 60 is detached from the graded cam N1 formed inside the carrier unit 70 because the carrier unit 70 is moved from the eject position P1 to the DL start position P3. However, as described above, because the disc cartridge 13 is in contact with the front surface 89 of the carrier unit 70, the engaging jaw 63 is continuously in contact with the side surface of disc cartridge 13 even if the lever body 61 is detached from the cam N1. Therefore, the disc lever 60 is maintained at a position that the carrier unit 70 is at the eject position P1, and then the disc lever 60 does not bar the insertion of the disc cartridge 13.

On the other hand, when the carrier unit 70 begins to move in the arrow Y1 direction from the eject position P1 to the position indicated by P2 (the same position of the 8L start position in FIG. 12) in FIG. 18, the cartridge lever 77 is relatively moved in the arrow Y2 direction with respect to the carrier unit 70. Additionally, the axis portion 105 of the cartridge lever 77 is restrictively moved to the Y2 position within the cartridge lever guide grooves 103, 104 at the time point that the carrier unit 70 is moved to the position P2.

The engaging jaw 106 of the cartridge lever 77 is maintained in contact with cartridge lever retrocede cam 54 during the move of the carrier unit 70 from the eject position P1 to the position P2, thereby the position of the cartridge lever 77 with respect to the holder 40 is not changed. However, as described above, the cartridge lever 77 is extended from the front surface 89 of the carrier unit 70 in the Y2 direction because the cartridge lever 77 is moved in the arrow Y2 direction with respect to the carrier unit 70.

When the carrier unit 70 is moved from the position P2 to the DL start position P3, because the axis portion 105 is restricted in the arrow Y2 direction by the cartridge lever guide grooves 103, 104 at the time point that the carrier unit 70 is moved to the position P3, the cartridge lever 77 is moved in the arrow Y1 direction together with the carrier unit 70.

Thereby, the engaging jaw 106 is detached from the cartridge lever retroceding cam 54 and the cartridge lever 77 is rotated clockwise and moved in the arrow Y1 direction by the cartridge lever actuating spring 108. Therefore, the cartridge lever 77 is actuated by the cartridge lever actuating spring 108 and then rotated clockwise centered on the axis portion 105. Additionally, an engaging recess 16 is formed on the side surface of the disc cartridge 13, located in the moving trajectory of the engaging jaw 106 of the cartridge lever 77.

Accordingly, as shown in FIG. 18, the engaging jaw 106 is engaged with the engaging recess 16 of the disc cartridge 13 by the rotation of the cartridge lever 77.

Then, accompanied with the carrier unit 70 and in the status wherein the side surface of the cartridge lever 77 is detached from the edge 53a, the cartridge lever 77 is maintained in a status wherein the engaging jaw 106 is engaged with engaging recess 16, and is arranged along the right rail 50, which is extending in the arrow Y1, Y2 directions.

Moreover, the shutter lever 78 is rotated due to the move of the carrier unit 70. The shutter driving pin 113 is guided to move within the shape of the slit 126 due to the insertion of the carrier unit 70 because the shutter driving pin 113 installed on the shutter 78 is engaged with the slit 126.

Thereby, the shutter lever 78 is rotated and then the shutter 15, engaged with the shutter driving pin 113, is opened. At the time point that the shutter is fully opened, the shutter driving pin 113 is detached from the slit 126, and in addition the move of the shutter lever 78 is restricted by means of the engaging hole 111 engaged with the plate spring 79.

Refer to FIG. 26 again to describe the control operation of the control device 150. The control device 150 constantly monitors whether the switch SW1 is switched from OFF to ON in step 53 or whether the switch SW3 is switched from OFF to ON in step 54. Referring to FIG. 21C, the position that both the switches SW1 and SW3 are ON is the position in FIG. 21C. In the embodiment of the invention, this position is set to the DL start position P3. Therefore, the processes of step 51~54 are repeatedly executed until the positive determinations in steps 53, 54 are made, i.e., until the carrier unit 70 is moved to the DL start position P3.

Figure 19:
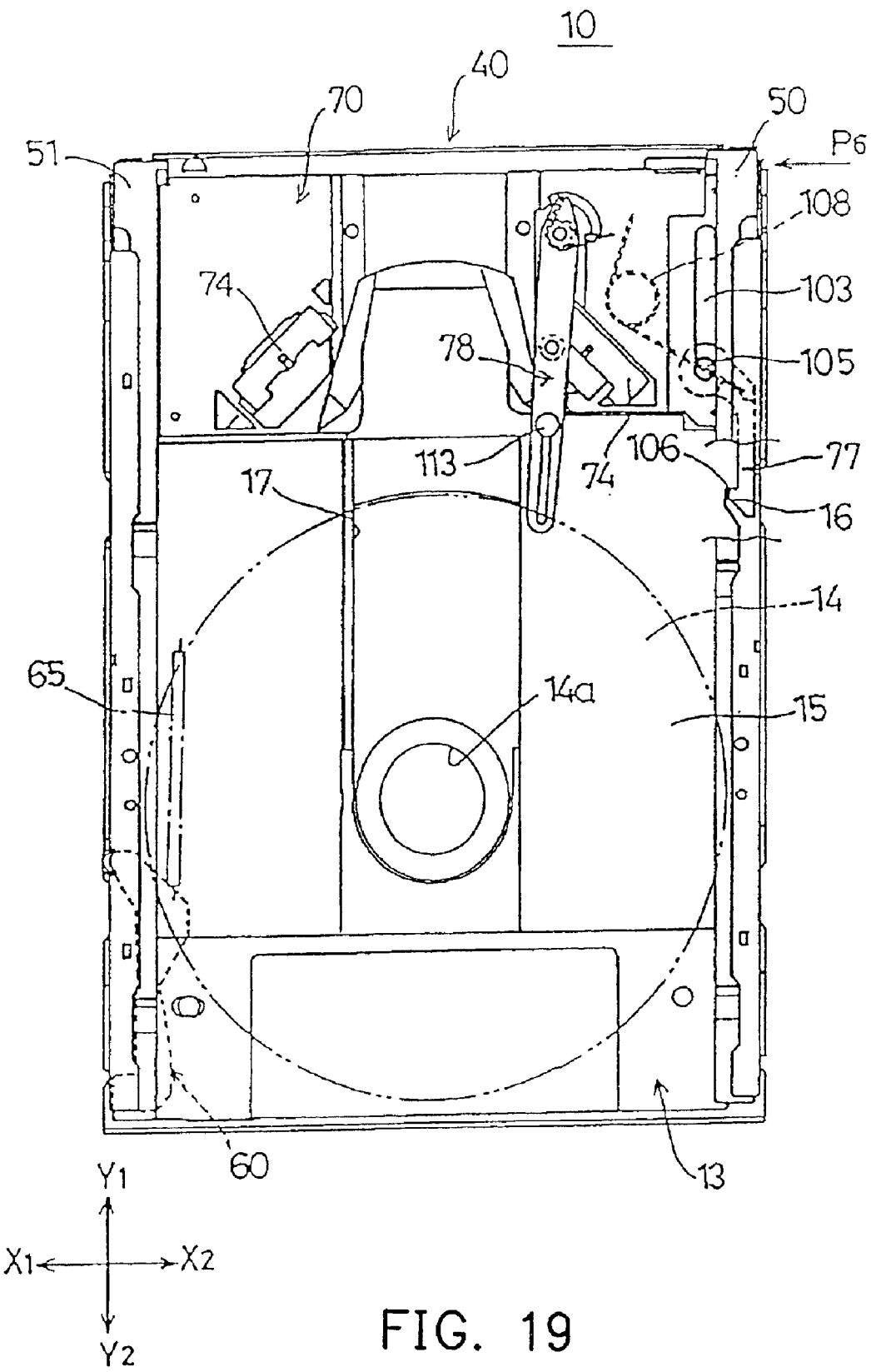
FIG. 19 is a diagram of the disc apparatus installing a recording medium loading apparatus executing the reproducing/recording process to the disc cartridge according to one embodiment of the invention.

On the other hand, when the positive determinations both in steps 53, 54 are made, i.e., when the carrier unit 70 is moved to the DL start position P3 is determined, the control device 150 applies the normal voltage (E) to the loading motor 100 in steps 53, 54. Thereby, the carrier unit 70 begins to move in the arrow Y1 direction by the driving force of the loading motor 100. The carrier unit 70 is moved to a position that a center hole 14a of a DVD-RAM 14 inside the disc cartridge 13 shown in FIG. 19 is coincident with the turntable 24.

Moreover, in the following description, the position of the carrier unit 70, wherein the center hole 14a of the DVD-RAM 14 is coincident with the turntable 24, is the disc cartridge loading finish position (DL finish position for short), indicated by P6 in FIG. 19. Additionally, the DL finish position P6 is set to the same position as the 12L retrocede position P6 in FIG. 17 during the transfer of the 12 cm disc 12. The position wherein the carrier unit 70 is at the DL finish position P6 is further referred to as the disc cartridge loaded position.

When the carrier unit 70 is moved from the DL start position P3 to the DL finish position P6, the disc lever 60 is in contact with the side surface of the disc cartridge 13 and maintained at the retrocede position without impeding the transfer of the disc cartridge 13.

In addition, after the process in step 55 is executed, the control device 150 constantly determines whether the switch SW3 is switched from OFF to ON after the switch SW3 is switched from ON to OFF in step 57. FIG. 21F shows the position that the switch SW3 is switched from OFF to ON after the switch SW 3 is switched from ON to OFF.

In the embodiment of the invention, the position shown in FIG. 21F is set to the DL finish position P6. Therefore, the carrier unit 70 is continuously moved until both the positive determinations in steps 56, 57 are made, i.e., until the carrier unit 70 is moved to the DL finish position P6.

On the other hand, when both the positive determinations in steps 56, 57 are made, the control device 150 stops the loading motor 100 in step 58, thereby, the carrier unit 70 is stopped at the DL finish position P6. Additionally, in the subsequent step 59, the control device 150 drives the clamping motor 68 and causes the holder driving slider 30 move in the arrow X1 direction (referring to FIG. 3). Thereby, the holder 40 is rotated centered on the rotational axis 57 from the moving-up position shown in FIG. 4A to the moving-down position shown in FIG. 4B. As a result, the disc cartridge 13 is also moved downward.

Therefore, the DVD-RAM 14 inside the disc cartridge 13 is held by the turntable 24, and is clamped between the turntable 24 and the damper 58. Accordingly, the DVD-RAM 14 becomes rotatable by the disc motor 25, and then it is possible to perform the reproducing/recording process to the DVD-RAM 14.

Furthermore, when the disc cartridge 13 is ejected from the disc apparatus 10, the operation is reverse to the loading operation described above, which detail description is omitted. However, in order to improve the operational property for taking out the disc cartridge 13 when the disc cartridge 13 is ejected, the normal voltage (E) is applied to the loading motor 100 during the whole interval from the DL finish position P6 to the eject position P1.

According to the embodiment of the invention mentioned above, when the type of the discs 11, 12 or the disc cartridge 13 inserted into and held by the carrier unit 70 is determined by the switches SW1~SW3, the control device 150 utilizes the driving control of the loading motor 100 to cause the carrier unit to move to the proper clamp positions P4~P6 corresponding to the determined disc 11, 12 or the disc cartridge 13, and thereafter the disc 11, 12 or the disc cartridge 13 is clamped by the turntable 24. Therefore, even if the size and shape of the disc 11, 12 or the disc cartridge 13 are different, the disc 11, 12 or the disc cartridge 13 can be accurately and firmly clamped by the turntable 24.

Additionally, in the embodiment of the invention, the detecting positions (P1, P2, P4, P5) of the carrier unit 70 set for the 8 cm disc 11, the detecting positions (P1, P4, P5, P6) of the carrier unit 70 set for the 12 cm disc 12, and the detecting positions (P1, P3, P6) of the carrier unit 70 set for the disc cartridge 11 have positions set to the same in a plurality of positions.

More particularly, the eject position P1 is common for the discs 11, 12 and the disc cartridge 13. In addition, the 8L finish position P4 and the 12L start position P4, the 8L retrocede position P5 and the 12L finish position P5, the 12L retrocede position P6 and the DL finish position P6 are respectively set to the common position.

In the conventional loading apparatus, it requires eleven different detecting positions for all cases where different detecting positions are set for each disc 11, 12 and the disc cartridge 13. However, according to the embodiment of the invention, the detecting positions can be reduced to six positions (P1~P6) because some of the detecting positions are common. Accordingly, the control process executed by the control device 150 can be simplified, and additionally, the number of the switches (SW1~SW3) for detecting that the carrier unit 70 is moved to the detecting positions can be reduced.

Furthermore, in the embodiment of the invention mentioned above, the switches SW1~SW3 and the carrier position detecting cam 140 are used for performing the position detection of the carrier unit 70. The carrier position detecting cam 140 comprises the upper cam 141 engaged with the switches SW1, SW3 and the lower cam 142 engaged with the switches SW2. Then, the position detection of the carrier unit 70 is performed according to the combination of the output signals of the switches SW1~SW3.

Therefore, the position detection for the carrier unit 70 having six detecting positions (P1~P6) can be detected by three switches SW1~SW3, which can reduce the switch number. As a result, the structure of the recording medium loading apparatus and the disc apparatus 10 can be simplified and the part number can be also reduced.

Moreover, according to the invention, the switches SW1~SW3 are ON/OF by press operation, which is operated by the carrier position detecting cam 140. Therefore, the position detection becomes possible because the cam shapes formed on the carrier position detecting cam 140 are different for each detecting position of the carrier unit 70, thereby the position detection of the carrier unit 70 can be accurately performed by the simple structure.

Furthermore, in the embodiment mentioned above, the recording medium loading apparatus having a compatible disc apparatus for loading any one of the 8 cm disc 11, 12 cm disc 12 and the disc cartridge 13 is used as an example for description. However, the invention is not restricted to the compatible disc apparatus, the invention is also suitable for a disc apparatus for only loading the disc.

According to the embodiment of the invention, because the disc-shaped recording medium is held by the transferring mechanism and the disc holding member at different positions and then transferred in such status, the disc-shaped recording medium is not detached from the transferring mechanism, thereby a stable transferring process can be performed.

According to the embodiment of the invention, because the holding device further comprises a fixing portion fixed to the carrier and tongue pieces with an elastic property extending from the fixing portion and being in contact with a front edge of the disc-shaped recording medium with respect to an insertion direction by an actuating force, the disc-shaped recording medium can be firmly and accurately held by a simple structure.

In addition, because the transferring process is processed in a clamped status such that the holding device is in contact with the front edge of the disc-shaped recording medium, the relative slide between the holding device and the disc-shaped recording medium does not occur during the transferring process, and thereby a highly accurate transferring process can be performed.

According to the embodiment of the invention, even though a drawing force from the carrier is applied to the disc-shaped recording medium in the holding status, because the drawing force is resiliently applied to the disc-shaped recording medium, even if the drawing force is applied to the disc by mistake when the disc-shaped recording medium is transferred, the disc-shaped recording medium can be prevented from being detached from the holding device.

Furthermore, in this invention, compared with that where the disc-shaped recording medium is gripped and held by two holding devices, the part number can be reduced and the carrier can become more compact and small.

Additionally, when the reproducing and/or recording process is processed to the disc shaped-recording medium, because the holding member driving device is engaged with the disc holding member accompanied with the holder and the base being relatively close and the engaging force is used as a driving force to cause the disc holding member to be detached from the disc-shaped recording medium, the disc holding member can be accurately detached from the disc-shaped recording medium by the simple structure.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A recording medium loading apparatus capable of loading a disc-shaped recording medium, comprising:
   a carrier for transferring the disc-shaped recording medium between a first position to insert/remove the disc-shaped recording medium and a second position to perform a reproducing and/or recording process; and
   a holding device installed on the carrier for holding an outer circumference of the disc-shaped recording medium;
   wherein the holding device is in contact with top and bottom portions of the outer circumference of the disc-shaped recording medium by clamping the outer circumference of the disc-shaped recording medium from the top and the bottom, and clamps a portion in an insertion direction from a central-front portion of the disc-shaped recording medium with respect to the insertion direction, and
   wherein at least when the carrier starts moving from the first position to the second position, the holding device holds the portion in the insertion direction from the central-front portion of the disc-shaped recording medium, and does not hold a portion of the disc-shaped recording medium in an eject direction.

2. A recording medium loading apparatus capable of loading a disc-shaped recording medium, comprising:
   a carrier for transferring the disc-shaped recording medium between a first position to insert/remove the disc-shaped recording medium and a second position to perform a reproducing and/or recording process; and
   a holding device installed on the carrier for holding an outer circumference of the disc-shaped recording medium, the holding device comprising:
      a fixing portion fixed to the carrier,
      a plurality of tongue pieces, being in contact with the disc-shaped recording medium to actuate a force, and
      an elastic portion, located between the fixing portion and the tongue pieces, the elasticity of the elastic portion enabling the tongue pieces to actuate an elastic force on the disc-shaped recording medium when the disc-shaped recording medium is held by the holding device,
   wherein the holding device is in contact with top and bottom portions of the outer circumference of the disc-shaped recording medium by clamping the outer circumference of the disc-shaped recording medium from the top and the bottom, and clamps a central-front portion of the disc-shaped recording medium with respect to an insertion direction.

3. The apparatus of claim 2, wherein the tongues pieces gradually close to the disc-shaped recording medium with respect to the insertion direction and then contact the outer circumference of the disc-shaped recording medium.

4. The apparatus of claim 2, wherein the holding device further comprises a disc detecting switch for detecting the loading of the disc-shaped recording medium by means of being in contact with the outer circumference of the disc-shaped recording medium, the disc detecting switch comprising:
   a body of the detecting switch, installed on the carrier,
   driving pieces to drive the detecting switch, installed so as to be able to move relatively to the body and to be in contact with the outer circumference of the disc-shaped recording medium, and
   a spring installed between the body and the driving pieces, pressing toward the disc-shaped recording medium that is inserted to the driving pieces,
wherein the fixing portion of the holding device is the body of the detecting switch, the tongue pieces of the holding device is the driving pieces of the detecting switch, and the elastic portion of the holding device is the spring of the detecting switch.

5. The apparatus of claim 1, comprising a disc detecting switch, installed on the carrier for detecting the loading of the disc-shaped recording medium by means of being in contact with the outer circumference of the disc-shaped recording medium.

6. A recording medium loading apparatus capable of loading a disc-shaped recording medium, comprising:
   a carrier for transferring the disc-shaped recording medium between a first position to insert/remove the disc-shaped recording medium and a second position to perform a reproducing and/or recording process; and
   a holding device installed on the carrier for holding an outer circumference of the disc-shaped recording medium,
wherein the holding device is in contact with top and bottom portions of the outer circumference of the disc-shaped recording medium by clamping the outer circumference of the disc-shaped recording medium from the top and the bottom, and clamps a front end in an insertion direction from a central-front portion of the disc-shaped recording medium with respect to the insertion direction,
wherein the holding device is capable of selectively and accurately holding a first disc-shaped recording medium with a first diameter, and a second disc-shaped recording medium with a diameter smaller than the first diameter, and
wherein at least when the carrier starts moving from the first position to the second position, the holding device holds the front end in the insertion direction from the central-front portion of the disc-shaped recording medium, and does not hold a portion of the disc-shaped recording medium in an eject direction.

7. A recording medium loading apparatus capable of loading a disc-shaped recording medium, comprising:
   a carrier for transferring the disc-shaped recording medium between a first position to insert/remove the disc-shaped recording medium and a second position to perform a reproducing and/or recording process, the carrier comprising a cartridge engaging member for engaging with a disc cartridge moveably arranged on the carrier for loading the disc-shaped recording medium, and selectively transferring the disc-shaped recording medium not loaded in the disc cartridge and the disc-shaped recording medium loaded in the disc cartridge; and
   a holding device installed on the carrier for holding an outer circumference of the disc-shaped recording medium,
wherein the holding device is in contact with top and bottom portions of the outer circumstance of the disc-shaped recording medium by clamping the outer circumstance of the disc-shaped recording medium from the top and the bottom, and clamps a central-front portion of the disc-shaped recording medium with respect to an insertion direction.

* * * * *